US007552860B2

(12) United States Patent
Tani et al.

(10) Patent No.: US 7,552,860 B2
(45) Date of Patent: Jun. 30, 2009

(54) PRODUCT HISTORY MANAGEMENT METHOD, APPARATUS, AND PROGRAM, LABEL ISSUING METHOD, APPARATUS, AND PROGRAM, AND IDENTIFICATION INFORMATION ISSUING APPARATUS

(75) Inventors: Kazuo Tani, Chiba (JP); Shuichi Ogawa, Chiba (JP); Norimitsu Sanbongi, Chiba (JP)

(73) Assignee: Seiko Instruments Inc. (JP)

( * ) Notice: Subject to any disclaimer, the term of this patent is extended or adjusted under 35 U.S.C. 154(b) by 544 days.

(21) Appl. No.: 10/942,456

(22) Filed: Sep. 16, 2004

(65) Prior Publication Data
US 2005/0240610 A1 Oct. 27, 2005

(30) Foreign Application Priority Data
Apr. 23, 2004 (JP) ............................. 2004-127516

(51) Int. Cl.
*G06F 17/00* (2006.01)
*G06F 19/00* (2006.01)
(52) U.S. Cl. ...................................... 235/375; 235/385
(58) Field of Classification Search ................ 235/375, 235/385; 452/149, 157
See application file for complete search history.

(56) References Cited

U.S. PATENT DOCUMENTS

| 5,233,533 | A | 8/1993 | Edstrom et al. ............. 364/468 |
| 5,478,990 | A | 12/1995 | Montanari et al. .......... 253/375 |
| 6,226,561 | B1 | 5/2001 | Tamaki et al. ............... 700/100 |
| 6,231,435 | B1 * | 5/2001 | Pilger ......................... 452/157 |
| 6,878,052 | B2 * | 4/2005 | Andersson ................... 452/149 |
| 7,032,816 | B2 | 4/2006 | Markham et al. ........... 235/376 |
| 7,035,877 | B2 | 4/2006 | Markham et al. ........... 707/200 |
| 7,047,159 | B2 | 5/2006 | Muehl et al. ................. 702/184 |
| 7,209,894 | B2 | 4/2007 | Sugamura et al. ............ 705/26 |
| 2001/0023376 | A1 | 9/2001 | Uchida et al. ............... 700/101 |

(Continued)

FOREIGN PATENT DOCUMENTS

EP 1249775 10/2002

(Continued)

OTHER PUBLICATIONS

White Paper, "ABCs of RFID: Understanding and Using Radio Frequency Identification", pp. 1-5, Intermec Technologies Corp., 2007.

(Continued)

*Primary Examiner*—Daniel A Hess
(74) *Attorney, Agent, or Firm*—Adams & Wilks

(57) ABSTRACT

A product history management apparatus issues to label issuing apparatuses identification information to be printed on a label affixed on a product produced in production steps from raw material production to final product production. An identification information receiving device receives from a label issuing apparatus associated with one of the production steps information printed on a label affixed in a production step immediately preceding the one production step. An identification information transmitting device issues new identification information relative to the received identification information and transmits to the label issuing apparatus associated with the one production step the issued identification information. An identification information storage device stores the received identification information in the production step immediately preceding the one production step in association with the issued and transmitted new identification information.

3 Claims, 24 Drawing Sheets

U.S. PATENT DOCUMENTS

| | | | |
|---|---|---|---|
| 2002/0188499 A1 | 12/2002 | Jenkins et al. | 705/10 |
| 2003/0050871 A1 | 3/2003 | Broughton | 705/28 |
| 2004/0024501 A1 | 2/2004 | Muehl et al. | 701/29 |
| 2004/0030428 A1 | 2/2004 | Crampton et al. | 700/101 |
| 2006/0111921 A1 | 5/2006 | Chang et al. | 705/1 |
| 2007/0016871 A1 | 1/2007 | Magnifico | 715/764 |

FOREIGN PATENT DOCUMENTS

| | | |
|---|---|---|
| JP | 2002169995 | 6/2002 |
| JP | 2002169996 | 6/2002 |
| JP | 2002182722 | 6/2002 |
| JP | 2002229620 | 8/2002 |
| JP | 2002341927 | 11/2002 |
| JP | 2002342431 | 11/2002 |
| WO | 0045324 | 8/2000 |
| WO | 0182009 | 11/2001 |
| WO | 03058563 | 7/2003 |
| WO | 03090036 | 10/2003 |
| WO | 2005062216 | 7/2005 |

OTHER PUBLICATIONS

"RFID Overview: Introduction to Radio Frequency Identification", pp. 1-7, Intermec Technologies Corp., 1999.

White Paper, Practical Uses for RFID Technology in Manufacturing and Distribution Applications, pp. 1-5, Intermec Technologies Corp., 2004.

White Paper, "Beyond the Tag—Finding RFID Value in Maufacturing & Distribution Applications", pp. 1-5, Intermec Technologies Corp., 2004.

White Paper, "SATO RFID", Sato America, Inc., pp. 1-13, Sato America, Inc., Aug. 31, 2004.

White Paper, "RFID: The Next Generation of AIDC", pp. 1-13, Zebra Technologies, 2004.

Industry Brief, "Motorola's Manufacturing RFID Solutions", pp. 1-4, Motorola, 2007.

"Bloomer Tracking Chocolate with RFID", 3 pages, RFID Journal, 2002.

Technical Brief, "Structuring Your RFID Business Goals", pp. 1-5, Symbol Technologies, Sep. 2004.

\* cited by examiner

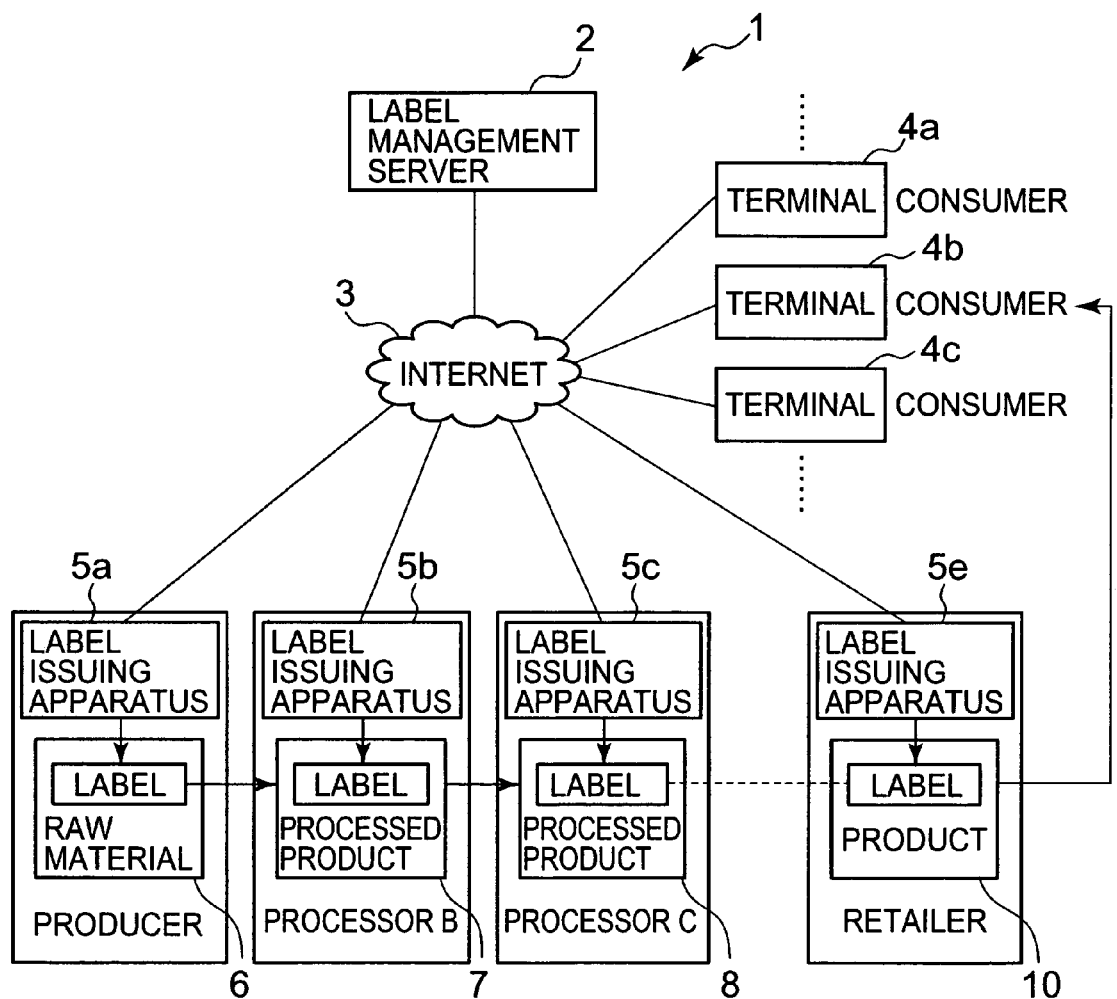

| LABEL ID | DETAILED INFORMATION |
|---|---|
| . . . | . . . |
| . . . | . . . |
| . . . | . . . |
| ⋮ | ⋮ |

FIG. 6

| LABEL ID IN PREVIOUS STEP | LABEL ID ISSUED THIS TIME | LABEL ISSUING APPARATUS ID |
|---|---|---|
| — | *****A | 12345 |
| *****A | *****B | 67890 |
| ⋮ | ⋮ | ⋮ |

| LABEL ISSUING APPARATUS ID | ACCESS INFORMATION | USER ID | PASSWORD |
|---|---|---|---|
| 12345 | http://...... | abcd | desk |
| | | cfgh | chair |
| | | ijkl | table |
| 67890 | http://...... | mnop | bootle |
| | | qrst | glass |
| ⋮ | ⋮ | ⋮ | ⋮ |

FIG. 9

LABEL ISSUING SCREEN — 68

| | |
|---|---|
| OPERATOR | [ ▽ ] |
| FEEDER'S CATTLE ORIGIN | [ ▽ ] |
| DATE OF BIRTH | [ ▽ ] YEAR [ ▽ ] MONTH [ ▽ ] DAY |
| SEX | [ ▽ ] |
| BRAND | [ ▽ ] |
| FEED | [ ▽ ] |
| BSE TEST RESULT NOTIFICATION | [ ▽ ] |
| QUARANTINE DATE | [ ▽ ] YEAR [ ▽ ] MONTH [ ▽ ] DAY |
| FEEDING PERIOD | [ ▽ ] MONTHS |
| SLAUGHTER DATE | [ ▽ ] YEAR [ ▽ ] MONTH [ ▽ ] DAY |
| SLAUGHTER TEST RESULT | [ ▽ ] |
| PURCHASER'S NAME | [ ▽ ] |

[ PRINT LABEL ] — 69

FIG. 10

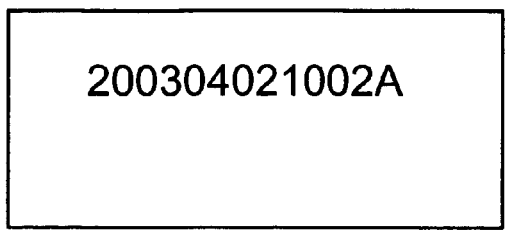

FIG. 11

| LABEL ID | DETAILED INFORMATION |
|---|---|
| ⋮ | ⋮ |
| 200304021005A | OPERATOR (YAMADA Taro) :IDENTIFICATION NUMBER (12345)<br>DATA INPUT DATE (APRIL 3, 2003)<br><br>FEEDER'S CATTLE ORIGIN (MIE PREFECTURE), DATE OF BIRTH (MARCH 8, 2000) SEX (STEER), BRAND (KUROGEWAGYU), FEED (KIND, BLEND, ADDITIVE, WITH OR WITHOUT MEAT-AND-BONE MEAL), BSE TEST RESULT NOTIFICATION (NEGATIVE) QUARANTINE DATE (APRIL 2, 2003), FEEDING PERIOD (35 MONTHS) SLAUGHTER DATE (APRIL 2, 2003), SLAUGHTER TEST RESULT (PASSED) PURCHASER'S NAME (KANTO MEAT PACKERS, INC.) |
| ⋮ | ⋮ |

FIG. 12

```
                    LABEL ISSUING SCREEN

PREVIOUS STEP    [          ]
    LABEL ID
    MEASUREMENT      [          ] g
    CUTTING WAY      [        ▽]
    CUTTING DATE     [ ▽]YEAR[ ▽]MONTH[ ▽]DAY
    NAME OF CUT MEAT [        ▽]
    DRESSED CARCASS  [          ]
    NUMBER
    PROCESSOR        [        ▽]
    COOL AND STORAGE [        ▽]
    CONDITION
    MEASURED VALUE   [          ] g
    RATING           [        ▽]
    SHIPMENT DATE    [ ▽]YEAR[ ▽]MONTH[ ▽]DAY

[PRINT LABEL]
```

70

71

| LABEL ID | DETAILED INFORMATION |
|---|---|
| ⋮ | ⋮ |
| 200304061423B | DATA INPUT DATE (APRIL 6, 2003)<br>PREVIOUS STEP IDENTIFIER (200304021005A)<br>MEASUREMENT (500g), CUTTING WAY (CUT INTO LARGE PIECES), CUTTING DATE (APRIL 5, 2003), CUT MEAT (LOIN), DRESSED CARCASS NUMBER (456)<br>PROCESSOR (SATO Takeshi), COOL AND STORAGE CONDITION (0°C, 48 HOURS)<br>MEASURED VALUE (500g), RATING (A-5), SHIPMENT DATE (APRIL 6, 2003) |
| ⋮ | ⋮ |

FIG. 18

FOOD PRODUCTION HISTORY SEARCH RESULT (OUTLINE)

PRODUCER △△Taro
  PROCESSOR ○○FOOD INDUSTRY
  RETAILER (OR FOOD SERVICE INDUSTRY)
      □□MEAT STORE

[DISPLAY DETAILED CONTENT]  [RETURN]

FIG. 19

FOOD PRODUCTION HISTORY SEARCH RESULT (DETAIL)

PRODUCER △△Taro ADDRESS・・・
 ORIGIN・・・ FEED・・・ SLAUGHTER DATE・・・
PROCESSOR ○○FOOD INDUSTRY ADDRESS・・・
 MEASURED VALUE・・・ COOL AND STORAGE CONDITION・・・
RETAILER □□MEAT STORE ADDRESS・・・

[RESEARCH]  [RETURN]

PRODUCT HISTORY MANAGEMENT METHOD, APPARATUS, AND PROGRAM, LABEL ISSUING METHOD, APPARATUS, AND PROGRAM, AND IDENTIFICATION INFORMATION ISSUING APPARATUS

BACKGROUND OF THE INVENTION

1. Field of the Invention

The present invention relates to a product history management apparatus, and more particularly to an apparatus for issuing a label for affixing to food products.

2. Description of the Related Art

Heretofore, consumers have taken great interest in safety or quality of food products that have an intense effect on their health.

The consumers judge the product for safety or quality based on a brand of the product or indication of a label affixed to the product when purchasing food products, and select an appropriate one.

However, it is easy for dealers to determine the indication of the label as they like and to print the label. In recent years, there have been many issues regarding incorrect label indication or deceptive indication of the food products, the issues being serious in society.

The consumers have no other choice than to rely on the contents of the indication of the label affixed onto the food products and hardly acquire accurate information from the incorrect label indication.

Therefore, reliability for the indication of the food products has been remarkably lowered. In light of the circumstances, it is necessary to wrestle with a problem of how to give the consumers true information about food products.

Also, food dealers assure the consumers of safety or quality that will ease consumer's anxiety and thus can differentiate their products from those of the other dealers.

As described above, as a system for disclosing information about food products, there is a farm product distribution system based on identifier provision as described below (see JP 10-302105 A). The invention as disclosed in JP 10-302105 A aims at giving a farm product ID number and managing individual information related to the farm product together with the ID number with a computer system that is operated by a neutral organization. The consumer inquiries the ID number assigned to the purchased farm product of the computer system and thus can confirm the individual information related to the farm product.

However, this system can provide the consumer with individual information relating to produced food products, for example, vegetables and fruits when the food products are directly delivered to the consumer. However, nowadays, most of food products provided to the consumers are produced through a number of steps, making it difficult to offer the consumer complete information throughout the production steps.

Therefore, even when a product is mixed with a deceptive material in any step or stored in bad environments, the consumer hardly acquires the information about the fact.

Also, in recent years, there is an increasing demand to architect a system capable of tracing a history from a raw material to a product for pharmaceuticals as well.

SUMMARY OF THE INVENTION

The present invention has been made in view of the above-mentioned circumstances, and therefore has an object to provide a product history management apparatus capable of managing a history of a product from its production to delivery to consumers.

According to the present invention, there is provided a product history management apparatus for issuing identification information to be printed on a label affixed on a product produced in each of steps from raw material production to final product production to label issuing apparatuses, the product history management apparatus including: identification information receiving means for receiving from the label issuing apparatus provided for one of the steps, identification information printed on a label affixed in a step immediately preceding the one step; identification information transmitting means for issuing new identification information with respect to the received identification information and transmitting the issued identification information to the label issuing apparatus provided for the one step; and identification information storage means for storing the received identification information in the step immediately preceding the one step in association with the new identification information issued and transmitted (first structure).

The product history management apparatus according to the first structure may further include: inquiry accepting means for accepting an inquiry about detailed information from a terminal; identification information search means for searching the identification information storage means for the inquired identification information and identification information associated with the inquired identification information; and searched identification information transmitting means for transmitting the searched identification information together with associations to the terminal (second structure).

The product history management apparatus according to the second structure may further include: a second identification information transmitting means for transmitting to a detailed information storage device storing the identification information in association with detailed information related to a product affixed with a label on which the identification information is printed, the identification information searched with the identification information search means; detailed information receiving means for receiving detailed information associated with the transmitted identification information from the detailed information storage device; and detailed information transmitting means for transmitting the received detailed information to the terminal (third structure).

In the product history management apparatus according to the third structure, the detailed information storage device may have detection information creating means for creating modification detection information whose value changes when the detailed information is modified; and the product history management apparatus may store identification information stored in the detailed information storage device in association with the modification detection information created by the detection information creating means with respect to detailed information associated with the identification information (fourth structure).

Further, according to the present invention, there is provided the label issuing apparatus provided for the one step out of the label issuing apparatuses used in the first structure, the label issuing apparatus including: the identification information transmitting means for transmitting identification information printed on a label affixed in a step immediately preceding the one step to the product history management apparatus; the identification information receiving means for receiving identification information issued with respect to the transmitted identification information from the product history management apparatus; and the printing means for printing the received identification information (fifth structure).

The label issuing apparatus according to the fifth structure, may further include: detailed information inputting means for inputting detailed information related to a product to which the printed label is affixed; and detailed information storage means for storing the input detailed information in association with the identification information printed on the printed label (the sixth structure).

The label issuing apparatus according the sixth structure, may further include: identification information inquiry accepting means for accepting an inquiry about identification information from the product history management apparatus; detailed information search means for searching the detailed information storage means for detailed information associated with the inquired identification information; and detailed information transmitting means for transmitting the searched detailed information to the product history management apparatus.

According to the present invention, there is provided a product history management method for issuing identification information to be printed on a label affixed on a product produced in each of steps from raw material production to final product production to label issuing apparatuses provided in each of the steps using a computer having identification information receiving means, identification information transmitting means, and identification information storage means, the product history management method including: receiving from the label issuing apparatus provided for one of the steps, identification information printed on a label affixed in a step immediately preceding the one step with the identification information receiving means; issuing new identification information with respect to the received identification information and transmitting the issued identification information to the label issuing apparatus provided for the one step with the identification information transmitting means; and storing the received identification information in the step immediately preceding the one step in association with the new identification information issued and transmitted with the identification information storage means.

According to the present invention, there is provided a product history management program executed by a computer for issuing identification information to be printed on a label affixed on a product produced in each of steps from raw material production to final product production to label issuing apparatuses provided in each of the steps, the product history management program including: the identification information receiving function for receiving from the label issuing apparatus provided for one of the steps, identification information printed on a label affixed in a step immediately preceding the one step; the identification information transmitting function for issuing new identification information with respect to the received identification information and transmitting the issued identification information to the label issuing apparatus provided for the one step; and the identification information storage function for storing the received identification information in the step immediately preceding the one step in association with the new identification information issued and transmitted.

According to the present invention, there is provided a label issuing method executed with the label issuing apparatus provided for the one step out of the label issuing apparatuses according to the first structure, the label issuing apparatus including a computer that has identification information transmitting means, identification information receiving means, and printing means, the label issuing method including: transmitting identification information printed on a label affixed in a step immediately preceding the one step to the product history management apparatus with the identification information transmitting means; receiving identification information issued with respect to the transmitted identification information from the product history management apparatus with the identification information receiving means; and printing the received identification information with the printing means.

According to the present invention, there is provided a label issuing program executed with the label issuing apparatus provided for the one step out of the label issuing apparatuses according to first structure, the label issuing program including: transmitting identification information printed on a label affixed in a step immediately preceding the one step to the product history management apparatus with the identification information transmitting means; receiving identification information issued with respect to the transmitted identification information from the product history management apparatus with the identification information receiving means; and printing the received identification information with the printing means.

Also, the present invention provides a product history management system, including: a product history management apparatus; label issuing apparatuses; and a history search apparatus, the product history management apparatus issuing identification information printed on a label affixed on a product produced in each of steps from raw material production to final product production to the label issuing apparatuses provided for each of the steps and including: receiving means for receiving a request for issuance of identification information from the label issuing apparatus provided for one of the steps; and transmitting means for transmitting identification information in response to the received request of issuance, the label issuing apparatuses each including: identification information acquiring means for acquiring identification information printed on a label affixed in a step immediately preceding the one step; sending means for sending a request for issuance of identification information to the product history management apparatus; receiving means for receiving identification information issued in response to the sent request for issuance from the product history management apparatus; printing means for printing the received identification information; and storage means for storing the identification information acquired by the identification information acquiring means in association with the identification information received by the receiving means, and the history search apparatus including: inquiry accepting means for accepting an inquiry about identification information; identification information searching means for searching the storage means of the label issuing apparatuses provided in each of the steps for the inquired identification information and identification information associated with the inquired identification information; and searched identification information transmitting means for transmitting the searched identification information together with associations.

The present invention provides a product history management apparatus used in a product history management system for managing a product history by attaching a recording medium recording identification information to a product produced in each of steps from raw material production to final product production, product the history management apparatus including: identification information receiving means for receiving, from identification information issuing apparatuses provided at least for each of partially continuous steps, identification information recorded on a recording medium attached in a step immediately preceding the step for which each of the identification information issuing apparatuses are provided; a first identification information transmitting means for issuing new identification information with respect to the received identification information and transmitting the issued identification information to the identification information issuing apparatus; and identification information storage means for storing the received identification information in the immediately preceding step in association with the transmitted identification information (twelfth structure).

In the product history management apparatus according to the twelfth structure, the product history management system may include: an upstream step group for electronically recording identification information to a semiconductor circuit and attaching the semiconductor circuit to a product; and a downstream step group for recording identification information on a label and affixing the label on a product, and stores associations of the identification information recorded on the label in the downstream step group; the identification information receiving means receives identification information issued in the upstream step group from the identification information issuing apparatuses; and the identification information storage means stores the received identification information in the upstream step group in association with the transmitted identification information to be printed (thirteenth structure).

The product history management apparatus according to the twelfth or thirteenth structure may further include: inquiry accepting means for accepting an inquiry about identification information from an inquirer of the identification information; identification information search means for searching the identification information storage means for the inquired identification information and identification information associated with the inquired identification information; and searched identification information transmitting means for transmitting the searched identification information together with associations to the inquirer (fourteenth structure).

The product history management apparatus according to the fourteenth structure may further include: a second identification information transmitting means for transmitting to a detailed information storage device storing the identification information in association with detailed information related to a product attached with a recording medium recording the identification information, identification information searched with the identification information search means; detailed information receiving means for receiving detailed information associated with the transmitted identification information from the detailed information storage device; and detailed information transmitting means for transmitting the received detailed information to the inquirer (fifteenth structure). Here, the detailed information may be transmitted in association with the identification information.

The product history management apparatus according to the fifteenth structure may further include: identification information search request means for requesting another product history management apparatus storing identification information in a step next to each of the continuous steps to search identification information associated with the inquired identification information; and requested identification information receiving means for receiving the identification information searched in response to the request from the other product history management apparatus, in which the searched identification information transmitting means may transmit to the inquirer the identification information searched through the identification information storage means and the identification information received from the other product history management apparatus together with associations (sixteenth structure).

The product history management apparatus according to sixteenth structure may further include: detailed information search request means for requesting the other product history management apparatus to search detailed information associated with the requested identification information; and requested detailed information receiving means for receiving the detailed information searched in response to the request, in which the detained information transmitting means transmits the received detailed information to the inquirer (seventeenth structure). Here, the detailed information may be received in association with the identification information and the detailed information associated with the identification may be transmitted to the inquirer.

Further, the present invention provides an identification information issuing apparatus used in a product history management system for managing a product history by attaching a recording medium recording identification information to a product produced in each of steps from raw product production to final product production, the identification information issuing apparatus including: identification information transmitting means for transmitting identification information recorded on a recording medium attached in a step immediately preceding a step for which the identification information apparatus is provided, to the product history management apparatus; identification information receiving means for receiving identification information issued with respect to the transmitted identification information from the product history management apparatus; and recording means for recording the received identification information on the recording medium (eighteenth structure).

The identification information issuing apparatus according to the eighteenth structure may further include: detailed information inputting means for inputting detailed information related to a product to which the recording medium recording the identification information is attached; and detailed information storage means for storing the input detailed information in association with the identification information recorded on the recording medium (nineteenth structure).

The identification information issuing apparatus according to the nineteenth structure may further include: identification information inquiry accepting means for accepting an inquiry about identification information; detailed information search means for searching the detailed information stored with the detailed information storage means for detailed information associated with the inquired identification information; and detailed information transmitting means for transmitting the searched detailed information to an inquirer (twentieth structure). Here, the identification information inquiry accepting means for accepting an inquiry about the identification information may include detailed information inquiry accepting means for accepting an inquiry about the detailed information upon receiving the identification information.

The identification information issuing apparatus according to any one of the eighteenth to twentieth structures may further include: reading means for reading identification information from a recording medium attached to a product in a step next to the step of storing the identification information with the product history management apparatus, in which the detailed information transmitting means transmits to the product history management apparatus the read identification information (twenty-first structure).

According to the present invention, it is possible to manage a history of a product from its production to delivery to consumers.

BRIEF DESCRIPTION OF THE DRAWINGS

In the accompanying drawings:

FIG. 2 is a conceptual diagram showing a network configuration of the label management system according to the embodiment of the present invention;

FIG. 6 is a conceptual diagram showing an example of a logical configuration of a label ID management database;

FIG. 9 shows an example of a label issuing screen;

FIG. 10 shows an example of a label printed with the label issuing apparatus;

FIG. 11 shows an example of a logical configuration of the detailed information database;

FIG. 12 shows an example of the label issuing screen;

FIG. 18 shows an example of a detailed information screen (outline);

FIG. 19 shows an example of a detailed information screen (detail);

DETAILED DESCRIPTION OF THE PREFERRED EMBODIMENT

Hereinafter, a preferred embodiment of the present invention will be described in detail with reference to the accompanying drawings.

(1) Summary of Embodiment

A label management system according to an embodiment of the present invention is structured such that a label ID is issued for all steps from raw material production to retail product production (retailer and food-service distributor) and a label ID issued this time and a label ID issued in the last step are associated to keep a history of the label IDs, making it possible to grasp a production or distribution history from raw material production to final product production.

A label management server 2 issues a label ID and label issuing apparatuses 5 provided for each step print a label.

More specifically, operators in each step read a label ID from a label affixed on a product delivered from a previous step and input detailed information in present step to transmit the information to the label management server. The label management server checks contents of the transmitted detailed information, and then issues and transmits a label ID for the step concerned in association with the received label ID to the operators. The operators affix a label with the label ID received from the label management server, on the product completed through the step concerned.

In this way, the label IDs are issued in association with one another in the step order, making it possible to trace the history of the product. Also, detailed information related to processing or distribution of a product (for example, weight, quarantine test result, address or name of producer etc., or the like for beef) is stored in association with the label ID in a database, by which the history of the product can be managed more precisely.

Also, when making a request to issue a label ID for a completed product, the operators should request it in association with the label ID issued in the previous step and thus cannot issue a label as they like. In this way, erroneously issued labels or deceptive labels are prevented from being distributed.

Further, a label issuing server manages the history of the label ID and the label issuing apparatus controls detailed information related to the product in each step. The detailed information related to the product can be stored in a distributed manner in the label issuing apparatuses 5. Therefore, a load on the label management server can be reduced.

Figure 1:
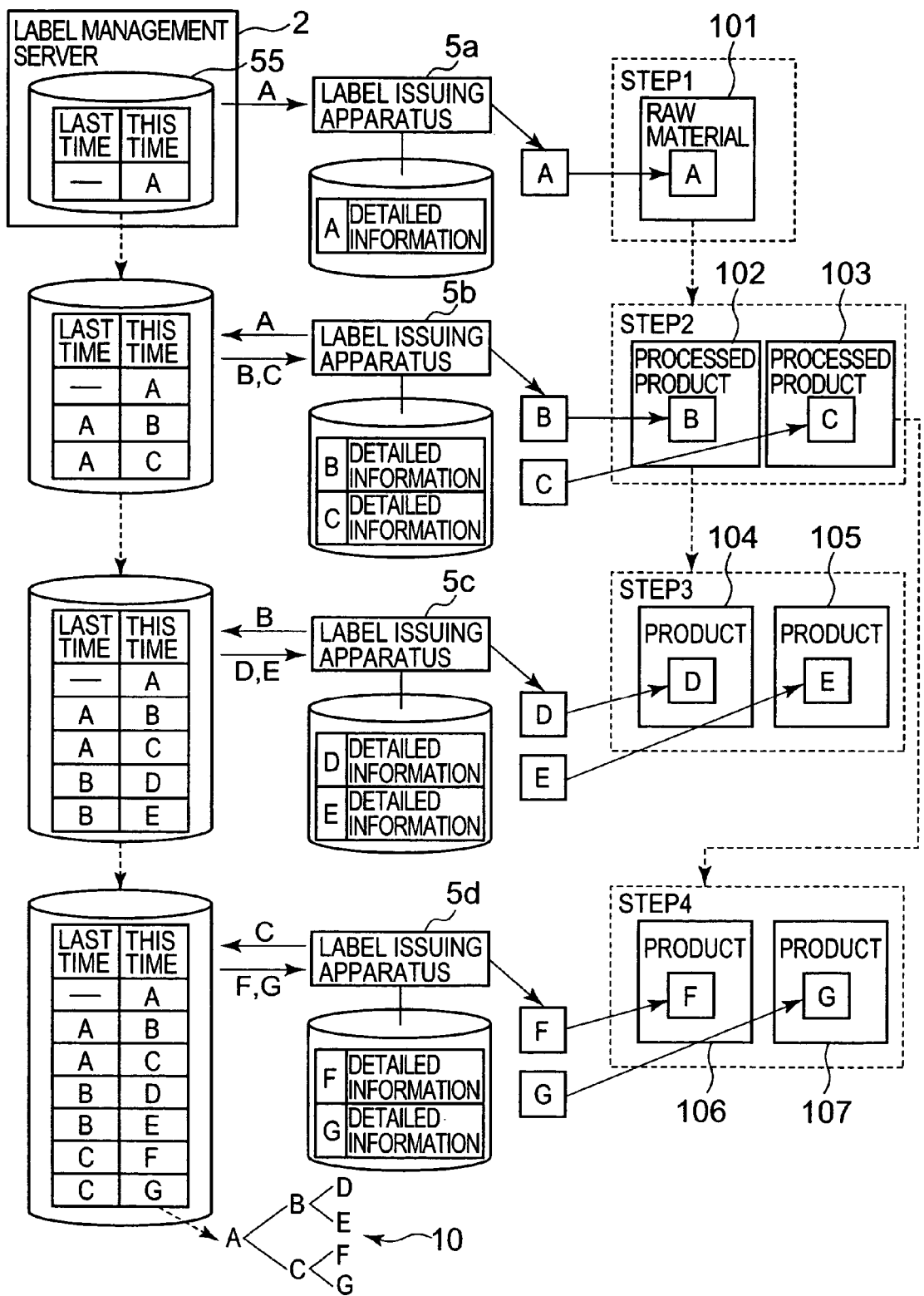
FIG. 1 illustrates an outline of how to manage a history of a product with a label management system according to an embodiment of the present invention.

FIG. 1 shows the label management system according to this embodiment and illustrates an outline of how to manage a history of a product using a label added with ID information.

Assume that a raw material produced in step S1 is processed in step S2, further processed into a product in steps S3 and S4, and delivered to the consumer. The target product may be a food product, for example, meat such as beef or seafood, or farm product.

The label issuing apparatus is provided in each step, which is networked with the label management server. In each step the label is affixed on the product, which is printed with the label ID issued from the label management server. The label management server 2 is provided with a label ID management database 55 for storing and managing the issued label ID. The label ID management database 55 stores a label ID issued in the previous step and a label ID issued this time in association with each other as described later. In FIG. 1, the label ID issued in the previous step is represented by "last time" and the label ID issued this time is represented by "this time" and both the label IDs are associated.

As described hereinbelow, the label management server stores the label ID transmitted from the label issuing apparatus in a region of "last time" of the label ID management database 55 and stores the label ID transmitted to the label issuing apparatus in a region of "this time".

The label management server issues the label ID to the product in each step in the following procedure.

First, the server issues a label ID (A) (hereinafter, referred to as "label ID-A") for step S1 from which a series of processings is started, and transmits it to a label issuing apparatus 5a. The label ID-A is stored in the label ID management database 55.

The label issuing apparatus 5a receives the label ID-A from the label management server and prints the label ID-A on a label. The printed label is affixed on a raw material 101.

At this time, detailed information related to the raw material (for example, slaughter date or BSE test result) can be input to the label issuing apparatus 5a. The label issuing apparatus 5a can store the label ID in association with the detailed information.

Next, it is assumed that the raw material 101 is shipped to the next place (step S2) and a processed product 102 and a processed product 103 are produced from this material.

In step S2, first, the label ID-A printed on the label is input to a label issuing apparatus 5b to transmit the label ID-A to the label management server.

The label management server receives and stores the label ID-A in the label ID management database 55 to issue a label ID-B and a label ID-C to the processed products 102 and 103, respectively. The server transmits the issued label IDs to the label issuing apparatus 5b and stores the label ID-B and the label ID-C in association with the previously received label ID-A in the label ID management database 55.

The label issuing apparatus 5b prints the label ID-B and the label ID-C transmitted form the label management server on labels. The printed labels are respectively affixed to the processed products 102 and 103, and the products are transferred to the next step.

Also, the label issuing apparatus 5b stores detailed information related to the processed products 102 and 103 in association with the label ID-B and the label ID-C, respectively.

Next, consider the case where the processed product 102 is transferred to step S3, and products 104 and 105 are produced.

In step S3, the label ID-B printed on the label on the processed product 102 is input to the label issuing apparatus 5c and transmitted to the label management server.

The label management server stores the label ID-B in the label ID management database 55 as well as issues a label ID-D and a label ID-E to the products 104 and 105 produced in this step. The label management server then transmits the label ID-D and the label ID-E to the label issuing apparatus 5c as well as stores those IDs in association with the label ID-B in the label ID management database 55.

The label issuing apparatus 5c prints the label ID-D and the label ID-E transmitted from the label management server on labels. The printed labels are respectively affixed on the products 104 and 105 that are retailed to the consumers.

The label issuing apparatus 5c also stores detailed information input with respect to the products 104 and 105, in association with the label ID-D and the label ID-E, respectively.

Meanwhile, it is assumed that the processed product 103 produced in step S2 is transferred to step S4 and products 106 and 107 are produced using the processed product 103.

Similar to step S3, the label management server stores a label ID-F and a label ID-G in association with the label ID-C of the label on the processed product 103, and a label issuing apparatus 5d prints the label ID-F and the label ID-G on labels.

The products 106 and 107 affixed with those labels are then retailed to the consumers.

Through the above procedure, a history of the products in every step from the raw material 101 to the products 104 to 107 is recorded in the label ID management database 55 as shown in a genealogical tree 10.

Also, detailed information in each step is stored in the label issuing apparatuses 5a to 5d in association with the label IDs.

The history of the label IDs and detailed information associated with each label ID are posted on the Internet, and the consumers can trace the history of a purchased product from a raw material to a final product in each step by using the label ID printed on the label affixed on the product.

For example, the consumer who purchased the product 107 searches the label ID management database 55 for the label ID, and acquires information that the product is produced through the steps of A, C, and G in this order. Further, the consumer makes an inquiry about the label ID-C with the label issuing apparatus 5c and can obtain detailed information related to the processed product 103.

Note that in the above example, for example, the label IDs are individually issued to the products 104 and 105 in step S3. However, the products produced under the same conditions and in the same step can be uniformly given the same label ID.

(2) Detailed Description of Embodiment

In this embodiment, a description is given using as an example a meat processing/distributing system for producing and distributing a beef product. Note that this system is similarly applicable to a distributing system of pharmaceuticals or other products in addition to the meat processing/distributing system.

FIG. 2 is a conceptual diagram showing a network configuration of a label management system 1 of this embodiment.

The label management system 1 is provided with the label management server 2, terminals 4a, 4b, 4c, ..., and the label issuing apparatuses 5a, 5b, 5c, 5d, and 5e, which are connectable with one another via an Internet 3.

The label management server 2 manages the label ID printed on wrappings etc. for a labeling object such as a raw material, processed product, or retail product and runs a Web site where the history of the label on the processed product and the retail product and the detailed information stored in the label issuing apparatuses 5a to 5e are posted on the Internet 3.

The label management server 2 issues, to the label issuing apparatus 5 (label issuing apparatus 5a in FIG. 2) placed in the slaughterhouse etc. at the step from which the production of a beef product starts, the first label ID of these series of label IDs whose history is recorded and transmits, to the label issuing apparatuses 5 (label issuing apparatuses 5b to 5e in FIG. 2) provided for the subsequent steps (e.g., process or retail), a label ID for the present step after receiving the label ID issued in the previous step.

Here, the label ID constitutes identification information printed on the label. The label management server 2 constitutes a product history management apparatus for managing the history of the label ID.

The label management server 2 includes identification information receiving means for receiving the label IDs from the label issuing apparatuses 5a to 5e and identification information transmitting means for transmitting the label IDs to the label issuing apparatuses.

The label issuing apparatuses 5a to 5e (hereinafter simply referred to as "label issuing apparatuses 5" unless otherwise specified) are printing apparatuses for printing the label IDs issued from the label management server 2 onto the labels and are provided for every step from production of beef at the slaughterhouse (label issuing apparatus 5a) to its process (label issuing apparatuses 5b to 5d) and retail (label issuing apparatus 5e).

As regards the label issuing apparatus 5a, the apparatus requests the label management server 2 to issue the label ID and receives the label ID issued by the label management server 2 in response to the request to thereby print the ID on the label.

The label issuing apparatuses 5b to 5e provided for the subsequent steps transmit the label ID affixed to the delivered beef product (label ID in the previous step) to the label management server 2 and receives the label ID for the present step from the label management server 2 to thereby print the ID on the label.

In this way, the label issuing apparatuses 5 are provided with the identification information transmitting means for transmitting the label ID issued in the previous step, the identification information receiving means for receiving the label ID transmitted from the label management server with respect to the transmitted label ID, and printing means (recording means) for printing the received label ID.

Note that data exchanged between the label management server 2 and the label issuing apparatuses 5 is wholly encrypted.

Also, the label issuing apparatuses 5 each function as a printer having a communication function as well as function as a database device for inputting the detailed information related to the labeling object and managing the detailed information in association with the label ID.

As discussed above, the label issuing apparatuses 5 include detailed information inputting means and detailed information storage means.

In addition, the label issuing apparatuses 5 each function as a Web server for putting the detailed information on the Internet 3.

The terminals 4 are terminal devices for accessing the label management server 2 or the label issuing apparatuses 5, for example, a personal computer connectable to the Internet 3.

The terminal 4 is mainly used to trace the history of a beef product that the consumer purchases by using a label ID printed on a package for the beef product. Also, the processor or retailer of the beef product uses the terminal 4 in tracing the history of delivered beef product.

The terminal 4 allows an access to the label management server 2 to trace the history of the label ID.

Also, the terminal 4 can receive, as described below, detailed information in each step from each label issuing apparatus 5 via the label management server 2 or directly.

In actual systems, there are plural processing/distributing processes for the beef product, and a structure thereof is complicated. FIG. 2 illustrates a case where a product 10 is obtained by slaughtering cattle to produce a raw material 6 and processing the raw material into processed products 7 and 8, as an example.

Also, the label issuing apparatuses 5 are constantly connected to the Internet 3 and provide detailed information whenever the label management server 2 or the terminal 4 makes a request.

Note that in this embodiment, the Internet 3 is adopted as a network for operating the label management system 1. However, the present invention is not limited thereto. Instead, a system may be architected, for example, by a local area network (LAN), a wide area network (WAN), or other such networks.

Figure 3A:
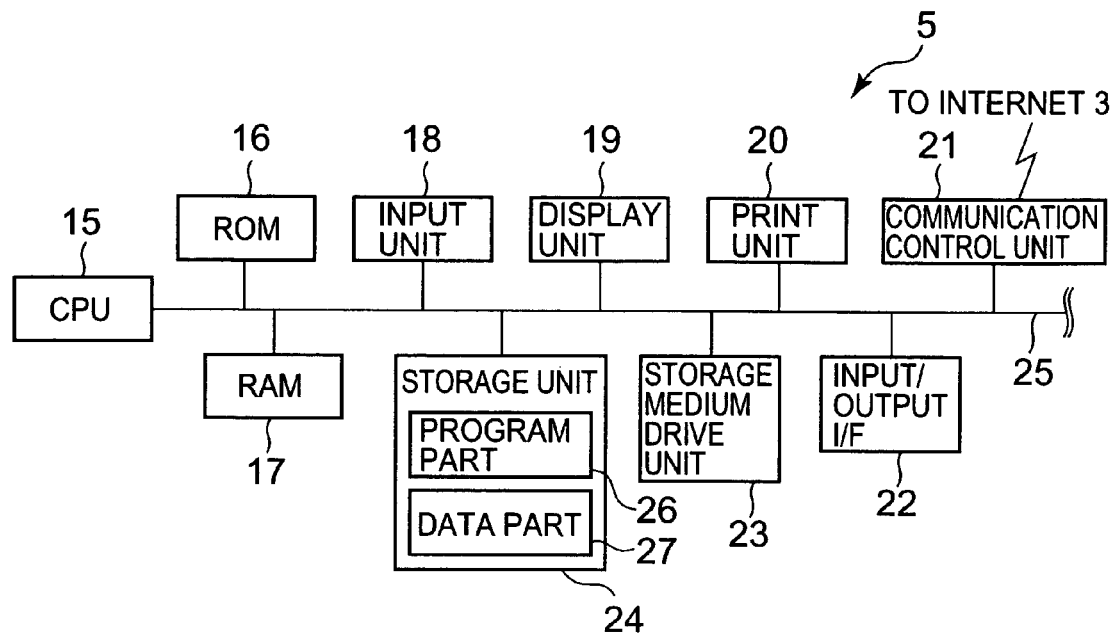
FIGS. 3A and 3B show an example of a hardware configuration of a label issuing apparatus.

FIG. 3A shows an example of a hardware configuration of the label issuing apparatuses 5.

The label issuing apparatuses 5 are each configured by a central processing unit (CPU) 15, a read only memory (ROM) 16, a random access memory (RAM) 17, an input unit 18, a display unit 19, a print unit 20, a communication control unit 21, an input/output interface (I/F) 22, a storage medium drive unit 23, and a storage unit 24. The respective functional parts are connected via a bus line 25.

The CPU 15 is a central processing unit for performing various arithmetic processings or information processing, or controlling respective components of the label issuing apparatuses 5 based on a predetermined program. In this embodiment, for example, the CPU serves to communicate with the label management server 2 to exchange the label ID therewith, print the label, or input or manage the detailed information. The ROM 16 is a read only memory that stores a basic program or data for operating the label issuing apparatuses 5.

The RAM 17 is a random access memory (read write memory (RWM)) that provides a working area for operating the CPU 15.

The CPU 15 is a functional part for inputting information to the label issuing apparatuses 5 and has a keyboard or mouse, for instance.

The keyboard includes character keys for inputting numerals and characters, a numeric keypad, and function keys for designating preset functions, and is used to in put the label ID printed on the label in the previous step or input the detailed information. The mouse is a pointing device for designating or selecting the element displayed on the display unit 19.

Upon reading a label ID printed on the label in the previous step using any device, the input unit 18 is provided with a device for reading the label ID.

For example, in the case where the label ID is printed in the numeric or barcode form, the device serves as a reading device for optically reading the numeric or bar-coded data. If the label ID is stored in a magnetic storage medium, the device serves as a magnetic reading device. In the case of using a non-contact IC chip, the device serves as a reader for reading the data stored in the non-contact IC chip.

In this embodiment, the label ID is printed in the numeric form and the operator inputs the ID with the keyboard.

The display unit 19 has a display device for displaying text or image information and displays information necessary for printing the label or managing the detailed information.

The display device includes a cathode-ray tube (CRT) display, a liquid crystal display, or a plasma display.

The print unit 20 is a functional part for printing the label and includes various types of printing apparatuses such as a laser printer, an inkjet printer, and a direct thermal printer.

A printer for special printing may be used as the printing apparatus, which hardly allows any counterfeit. A printer for printing holograph on the label is given as an example thereof.

The communication control unit 21 is a functional part for connecting the label issuing apparatuses 5 to the Internet 3. The label issuing apparatuses 5 can communicate with the label management server 2 or communicate with each other through the communication control unit 21.

The input/output I/F 22 is an interface for extending the function of the label issuing apparatuses 5 by connecting the label issuing apparatuses 5 to an external device. Examples of the connectable external device include: a storage device such as a hard disk or semiconductor memory device; an output device such as a speaker; and an input device such as a scanner.

The storage medium drive unit 23 is a functional part for driving a removably inserted storage medium to read and write data.

The random access memory (storage medium) is, for example, a flexible disk, a magneto-optical disk, a semiconductor memory device, a magnetic tape, or a paper tape.

Also, the read only memory (storage medium) is, for example, an optical disk such as a CD-ROM.

The label issuing apparatuses 5 can install a program from the storage medium inserted to the storage medium drive unit 23 and also backup the label ID or detailed information to the storage medium.

The storage unit 24 is, for example, a random access memory (storage device) with a large capacity, which is configured by a hard disk or the like.

A program part 26 storing programs and a data part 27 storing data are provided in the storage unit 24.

Figure 3B:
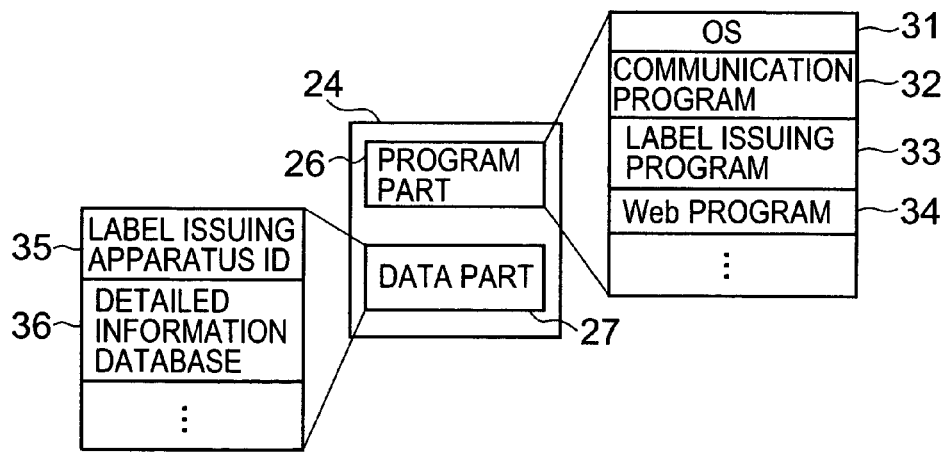

As shown in FIG. 3B, the program part 26 stores various programs such as an operating system (OS) 31, a communication program 32, a label issuing program 33, and a Web program 34, which can be run by the CPU 15.

The OS 31 is a program for causing the CPU 15 to exert the basic function of operating the label issuing apparatuses 5 such as managing the input/output of files or controlling various functional parts.

The communication program 32 is a program for causing the CPU 15 to exert a function of controlling the communication control unit 21 and maintaining connection between the Internet 3 and the label issuing apparatuses 5.

The label issuing program 33 is a program for causing the CPU 15 to exert the function of printing the label or managing the detailed information.

Examples of functions related to label printing include a function of a browser for allowing the display unit 19 to display a screen using screen data transmitted from the label management server 2 or screen data stored in the storage unit 24, and a function of transmitting the label ID in the previous step to the label management server 2 and receiving the label ID for the present step from the label management serer 2 to print the ID on the label.

Also, examples of the function of managing the detailed information include a function of allowing a user (operator in charge who operates the label issuing apparatus 5 in the step) to input the detailed information and storing the input detailed information in association with the label ID issued this time in the data part 27.

The Web program 34 causes the CPU 15 to exert a function of accepting an inquiry about the detailed information from the label management server 2 or the terminal 4 via the Internet 3 and searching the corresponding detailed information, in response to an inquiry request, to provide the obtained information.

In this case, the Web program 34 causes the label issuing apparatuses 5 to exert a function of a server for providing the detailed information.

The data part 27 stores various kinds of data and various databases necessary for operating the label issuing apparatuses 5, such as a libel issuing apparatus ID 35, or a detailed information database 36.

The label issuing apparatus ID 35 is ID information for identifying one of the label issuing apparatuses 5 from the rest and the label issuing apparatuses 5 transmit the label issuing apparatus ID 35 to the label management server 2, so that the label management server 2 can identify the label issuing apparatus 5.

The detailed information database 36 is a database storing detailed information (explained later) related to the product produced in the step in association with the corresponding label ID.

Figure 4:
FIG. 4 is a conceptual diagram illustrative of an example of a logical configuration of a detailed information database.

FIG. 4 is a conceptual diagram illustrative of an example of a logical configuration of the detailed information database 36.

As shown in FIG. 4, the detailed information database 36 stores the label IDs and the detailed information in a one-to-one correspondence, making it possible to search the detailed information with the label ID used as a key to search.

Figure 5:
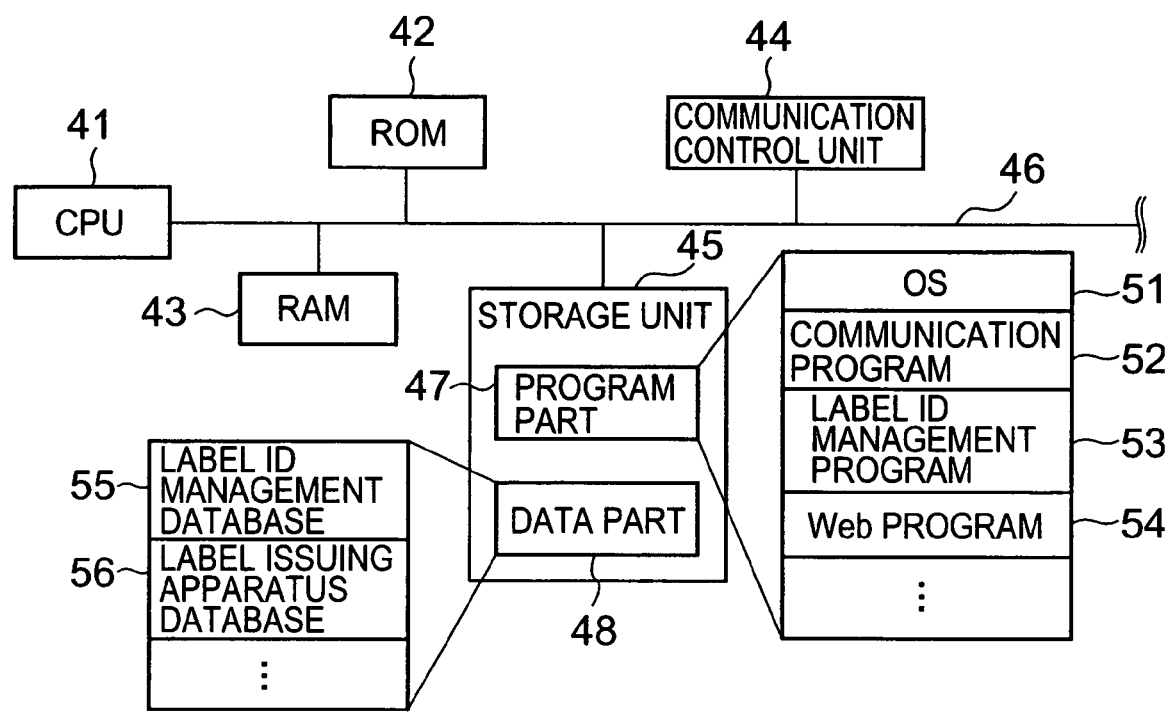
FIG. 5 shows an example of a hardware configuration of a label management server.

FIG. 5 shows an example of a hardware configuration of the label management server 2.

The label management server 2 includes a CPU 41, a ROM 42, a RAM 43, a communication control unit 44, and a storage unit 45. The respective functional parts are connected via a bus line 46. The CPU 41 is a central processing unit operating according to a predetermined program and causing the label management server 2 to exert a function of the server for issuing a label.

The ROM 42 is a read only memory storing a basic program or data for operating the label management server 2.

The RAM 43 is a random access memory (read write memory (RWM)) for providing a working area for operating the CUP 41.

The communication control unit 44 is a functional part for connecting the label management server 2 to the Internet 3. The label management server 2 can communicate with the label issuing apparatuses 5 and the terminal 4 through the communication control unit 44.

The storage unit 45 is, for example, a random access memory (storage device) with a large capacity, which is configured by a hard disk or the like.

A program part 47 storing programs and a data part 48 storing data are provided in the storage unit 45.

The program unit 47 stores various programs such as an OS 51, a communication program 52, a label ID management program 53, and a Web program 54.

The OS 51 is a program for causing the CPU 41 to exert the basic function of operating the label management server 2 such as managing the input/output of files or controlling various functional parts.

The communication program 52 is a program for causing the CPU 41 to exert the function of controlling the communication control unit 44 and maintaining connection between the Internet 3 and the label management server 2.

The label ID management program 53 is a program for causing the CPU 41 to exert the function of issuing the label ID or managing the issued label ID.

Regarding the function of issuing the label ID, for example, the label ID is issued and transmitted to the label issuing apparatus 5a in response to a request to issue the label ID, and then stored in the data part 48; a label ID in the previous step is received and a label ID for the present step is issued and transmitted to the label issuing apparatuses 5b to 5e. The label ID issued this time is stored in the data part 48 in association with the label ID in the previous step.

The Web program 54 is a program for causing the CPU 41 to provide to the terminal 4 services such as inquiring about the history of the label ID or detailed information via the Internet 3.

With regard to the label ID history inquiry service, when the terminal 4 requests the CPU 41 to inquire about the history of the label ID, the CPU 41 searches the data part 48 for the history of the requested label ID and creates screen data for displaying history to transmit the data to the terminal 4.

Further, in the case where the terminal 4 requests the CPU 41 to inquire about the detailed information, the CPU 41 accesses each of the label issuing apparatuses 5 printing the label ID to acquire the objective detailed information and creates screen data for displaying detailed information using the obtained detailed information to transmit the data to the terminal 4.

In this case, the label management server 2 functions as a Web server.

The data part 48 stores various databases and various kinds of data such as the label ID management database 55, or a label issuing apparatus database 56.

FIG. 6 is a conceptual diagram showing an example of a logical configuration of the label ID management database 55.

As shown in FIG. 6, in the label ID management database 55, the label ID issued in the previous step and the label ID issued this time are stored in association with each other. Also, the label issuing apparatus ID of the label issuing apparatus to which the label ID is transmitted is stored in association with the label ID issued this time.

The label management server 2 updates the label ID management database 55 each time the label ID is issued.

In this way, the label management server 2 is provided with identification information storage means for storing the label ID received from the label issuing apparatus and the label ID transmitted to the label issuing apparatus in association with each other.

The label management server 2 can obtain the history of the label IDs issued by tracing the association between the label ID in the previous step and the label ID issued this time in the label ID management database 55.

Also, it is possible to access the label issuing apparatus 5 specified based on the label issuing apparatus ID associated with the label ID issued this time to thereby request the detailed information related to the label ID of the label issuing apparatus 5.

Figures 7, 8:
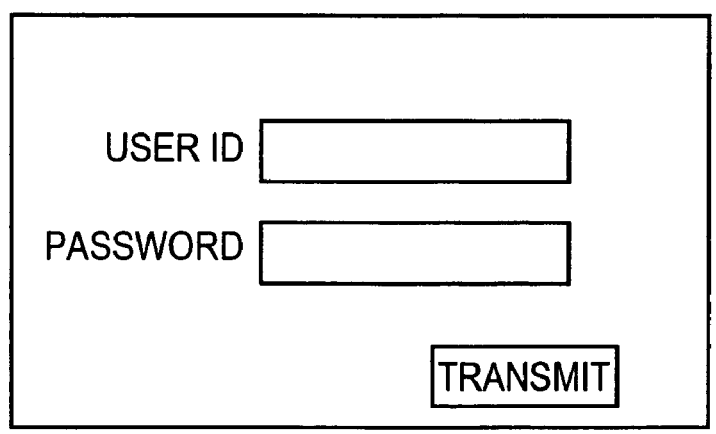
FIG. 7 is a conceptual diagram showing an example of a logical configuration of a label issuing apparatus database.
FIG. 8 shows an example of a login screen.

FIG. 7 is a conceptual diagram showing an example of a logical configuration of the label issuing apparatus database 56.

As shown in FIG. 7, the label issuing apparatus database 56 includes a label issuing apparatus ID 61, an access information 62, a user ID 63, a password 64, and other such items.

The label issuing apparatus ID 61 is given to each label issuing apparatus 5. When accessed by the label issuing apparatus 5, the label management server 2 receives the label issuing apparatus ID from the label issuing apparatus 5 and compares the received ID against the label issuing apparatus ID 61 to thereby specify which one of the label issuing apparatuses 5 accesses the server.

The access information 62 is used for accessing each label issuing apparatus 5 and, for example, includes uniform resource locators (URL).

The label management server 2 can access the desired label issuing apparatus 5 using the access information 62 when requesting the detailed information of the label issuing apparatus 5 via the Internet 3.

The user ID 63 and the password 64 are used for authenticating the user operating the label issuing apparatus 5 who tries to log in the label management server 2. One or more user IDs or passwords may be set for each label issuing apparatus 5.

The label management server 2 issues the label ID in the case where the user operating the label issuing apparatus 5 is authenticated.

Although not shown, the label issuing apparatus database 56 stores attached information necessary for issuing the label ID.

Examples of the attached information include information indicating whether the label issuing apparatus registered in the label issuing apparatus database 56 is provided for the first step (starting point) or for subsequent (downstream) steps.

The label management server 2 judges whether the label issuing apparatus 5 accessing the server is provided for the first step (starting point) or for subsequent (downstream) steps based on the attached information, and if the label issuing apparatus 5 is provided for the first step, issues the label ID in the present step in response to the request, and if the label issuing apparatus 5 is provided for the subsequent steps, issues the label ID in the present step upon receiving the label ID in the previous step.

FIG. 8 shows an example of a login screen displayed on the display unit 19 (see FIG. 3A) when the label issuing apparatus 5 accesses the label management server 2. The login screen is displayed using screen data transmitted from the label management server 2.

The user logs in, when printing the label with the label issuing apparatus 5, the label management server 2 with the login screen.

The login screen has, as shown in the figure, a user ID input box, a password input box, and a "transmit" button. The user inputs a user ID and a password in those boxes to select the "transmit" button (in the following description, selection of buttons is made by mouse-clicking). Then, the input user ID and password are transmitted to the label management server 2 and authenticated.

FIG. 9 shows an example of a label issuing screen 68 displayed on the display unit 19 with the label issuing apparatus 5a. The label issuing screen 68 is displayed using the screen data stored in the label issuing program 33 (see FIG. 3B) after logging in the label management server 2.

The item "operator" corresponds to a box in which the name of an operator who produces a beef product as a raw material from slaughtered cattle is input. The operator's name may be previously registered and selected from the drop-down menu. For the operator whose name has not been yet registered, his/her name is input with the keyboard. The following drop-down menu allows selection and input of previously registered input items as well as the input with the keyboard.

The items "feeder's cattle origin", "date of birth", "sex", and "brand" correspond to boxes where the origin, date of birth, sex, and brand of the slaughtered cattle are input, respectively.

The item "feed" corresponds to a box where feeds that were for raising the slaughtered cattle are input.

The item "BSE test result notification" corresponds to a box where a test period and result of so-called BSE test on the cattle are input.

The item "quarantine date" corresponds to a box where the quarantine date for the slaughtered cattle is input.

The items "feeding period" and "slaughter date" correspond to boxes where the feeding period and slaughter date for the slaughtered cattle are input, respectively.

The item "purchaser" corresponds to a box where information about the purchaser of the cattle from fatting cattle producers.

A "print label" button 69 is a button for starting label printing. When the user clicks on the "print label" button 69, the label issuing apparatus 5a requests the label management server 2 to issue the label ID and prints the label by using the label ID transmitted in response to the request.

The label issuing apparatus 5a stores the data for each item input in the above boxes as the detailed information in the detailed information database 36 (see FIG. 3B).

Note that the label screen 68 is used to input corresponding data in the step from which a series of processings is started and thus has no box for inputting the label. ID in the previous step.

FIG. 10 shows an example of a label printed with the label issuing apparatus 5a. As shown in FIG. 10, the label ID issued from the label management server 2 is printed on the label.

In the example of FIG. 10, the label ID is only printed on the label, but the detailed information and other such information (e.g., holograph as anti-counterfeit means) may be printed together with the label ID.

In this embodiment, the time information indicative of the issuance date of the label ID is included in the label ID. The label ID including the time information makes it easy to grasp the chronological order related to the issuance of the label ID, for example, helps the consumer or the like to search the deceptive label.

In the case of using the label of FIG. 10, the time information of "2003 Apr. 2 10:02" is embedded in the label ID.

The printed label is affixed on the produced beef product and the label-affixed product is shipped for the next step.

Note that a time adjusting center may be connected to the label management server 2 to set the time as appropriate.

FIG. 11 shows an example of a logical configuration of the detailed information database 36 in the label issuing apparatus 5a.

As shown in FIG. 11, the detailed information database 36 stores the input items that are input on the label issuing screen 68 as the detailed information in association with the printed label ID.

FIG. 12 shows an example of the label issuing screen 70 displayed on the display unit 19 in the label issuing apparatus 5b. The label issuing screen 70 is displayed using the screen data stored in the label issuing program 33 (see FIG. 33B) after logging in the label management server 2.

As shown in FIG. 12, the label issuing screen 70 is different from the label issuing screen 68 (see FIG. 9). The detailed information input according to each processing varies depending on the step. Therefore, the label issuing screen is set for each step. The label issuing screen is managed on the label issuing apparatus 5 side. This allows management of the screen independent of the label management server 2. Accordingly, it is possible to easily deal with the change in input item and enhance the flexibility of the label management system 1.

In the label issuing screen 70, the item "previous step label ID" corresponds to a box where the label ID printed on the label affixed on the beef product arrived from the previous step is input.

The item "measurement" corresponds to a box where the measured weight of processed beef is input.

The items "cutting way" and "cutting date" correspond to boxes where how the beef is cut upon the processing and the cut date are input.

The items "name of cut meat" and "dressed carcass number" correspond to boxes where the name of processed beef and the dressed carcass number are input, respectively.

The item "processor" corresponds to a box where the processor who processes the beef is input.

The item "cool and storage condition" corresponds to a box where the condition under which the beef product is stored is input.

The items "measured value" and "rating" correspond to boxes where the measured value and rating of the beef product are input, respectively.

The item "shipment date" corresponds to a box where the date of shipment for the next step is input.

A "print label" button 71 is a button for staring the label printing. When the "print label" button 71 is clicked on, the label issuing apparatus 5b transmits to the label management server 2 the label ID input in the item "previous step label ID" and the information such as the label issuing apparatus ID of the label issuing apparatus 5b and uses the label ID transmitted from the label management server 2 in return to thereby print the label. The input items input on the label issuing screen 70 are stored in the detailed information database 36 (see FIG. 3B) of the label issuing apparatus 5b.

Figures 13, 14:
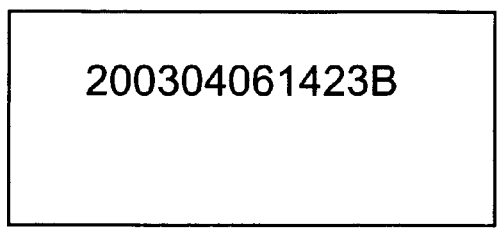
FIG. 13 shows an example of a label printed with the label issuing apparatus.
FIG. 14 shows an example of a logical configuration of the detailed information database.

FIG. 13 shows an example of a label printed with the label issuing apparatus 5b.

The label ID issued from the label management server 2 is printed on the label surface. The time information of "2003 Apr. 6 14:23" is embedded in the label ID.

The label is affixed on the product produced in the step concerned and shipped for the next step.

FIG. 14 shows an example of a logical configuration of the detailed information database 36 in the label issuing apparatus 5b.

As shown in FIG. 14, the detailed information database 36 stores the input items input on the label issuing screen 70 as the detailed information in association with the printed label ID.

Figure 15:
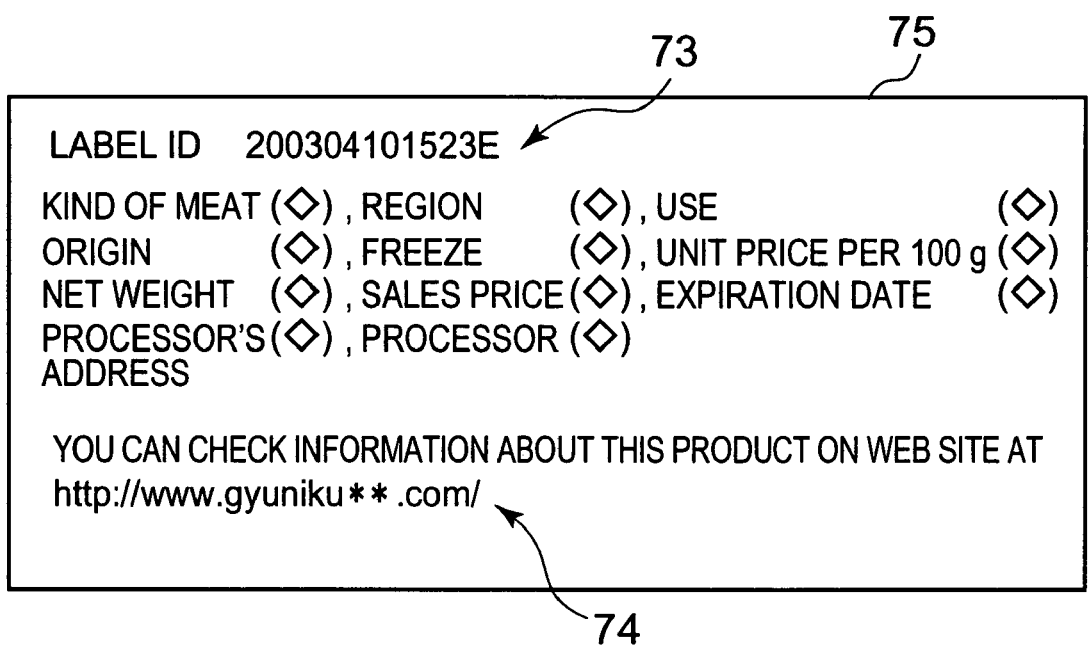
FIG. 15 shows an example of a label printed with the label issuing apparatus.

FIG. 15 shows an example of a label 75 printed by the label issuing apparatus 5e.

The label affixed to the retail product is provided to the consumer.

As shown in FIG. 15, a label ID 73 issued from the label management server 2 for the label 75 and mandatory information items are all printed on the label 75, which makes it possible to specify the beef product that the consumer inquires about.

Also the label 75 is printed with a URL 74 of the Web site to which inquiries about the product are directed. The Web site is provided by the label management server 2.

The consumer operating the terminal 4 can browse the information about the beef product from its production to the retail by accessing the URL 74.

Figure 16:
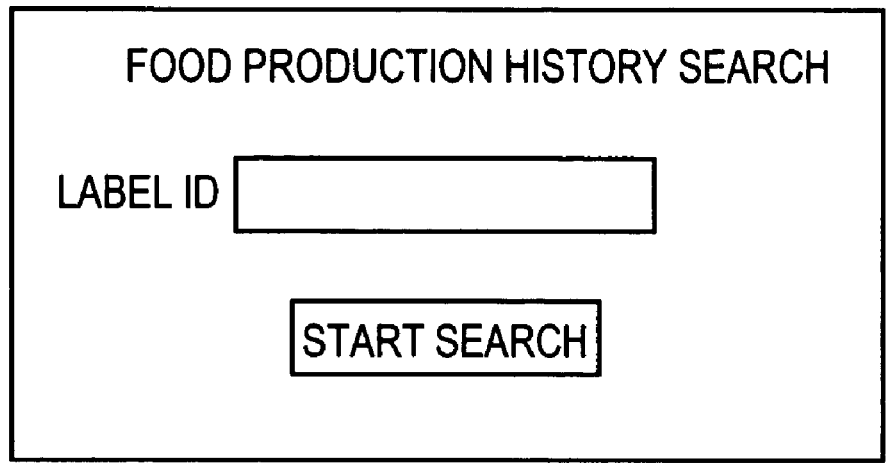
FIG. 16 shows an example of a search screen.

FIG. 16 shows an example of a search screen displayed on the terminal 4 when the consumer accesses the Web side set up by the label management server 2 from the terminal 4.

The screen is displayed using the screen data transmitted from the label management server 2, and the consumer and processor can browse the history and detailed information about the label ID related to the beef product with this screen.

The search screen has the label ID input box and the "start search" button.

When the label ID is input in the label ID input box and the "start search" button is clicked on, the input label ID is transmitted to the label management server 2 from the terminal 4 to start search for the label ID.

Note that the label management server 2 searches the label ID management database 55 for the received label ID and the label IDs related to the label ID concerned and transmits the label IDs together with the information on the association therebetween to the terminal 4.

In this way, the label management server 2 has inquiry accepting means for accepting an inquiry about the label ID from the terminal, identification information searching means for searching the requested label ID together with the label IDs related thereto, and search result information transmitting means for transmitting the searched label IDs together with information about the association therebetween.

Figure 17:
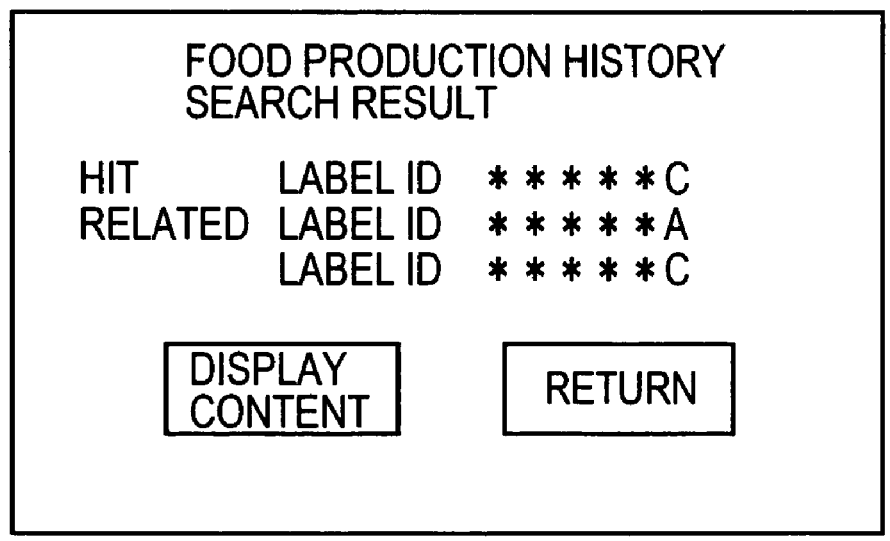
FIG. 17 shows an example of a search result screen.

Upon completion of the search, the search result screen of FIG. 17 is displayed on the terminal 4.

The search result screen displays a label ID hit by the search (the same as the input label ID) and a series of label IDs related to the label ID in history as related label IDs.

Clicking on a "display content" button opens the screen of the detailed information related to those label IDs and clicking on a "return" button returns the screen to the search screen.

FIG. 18 shows an example of detailed information screen (outline). The screen is displayed on the terminal 4 in response to click of the "display content" button on the search result screen.

The screen data used for displaying the screen is created by using the detailed information acquired by the label management server 2 from each label issuing apparatus 5.

The screen displays outlined detailed information, i.e., the producer, processor, and retailer.

Clicking on a "display detailed information" button opens a screen of more detailed information and clicking on a "return" button returns the screen to the search result screen.

The processing is performed by using the detailed information transmitted from each label issuing apparatus 5 in response to transmission of the label ID to each label issuing apparatus 5 printing the label ID from the label management server 2.

In this case, each label issuing apparatus 5 constitutes an identification information storage device for managing the label ID and the detailed information in association with each other.

The label management server 2 has searched identification information transmitting means for transmitting the label ID acquired by searching the label ID management database 55 in advance to the label issuing apparatus, detailed information receiving means for receiving the detailed information transmitted from each label issuing apparatus 5, and detailed information transmitting means for transmitting the received detailed information to the terminal 4.

Meanwhile, the label issuing apparatus 5 has identification information inquiry accepting means for accepting an inquiry about the label ID from the label management server 2, detailed information searching means for searching the detailed information database 36 for the requested label ID, and detailed information transmitting means for transmitting the searched detailed information to the label management server 2.

FIG. 19 shows an example of a search result screen (detail).

This screen is displayed by clicking on the "display detailed information" button on the detailed information screen (outline).

This screen displays all detailed information stored in each label issuing apparatus 5.

Referencing these series of screens, the consumers can grasp how the purchased beef product is processed through which kind of processing before they purchase it. Also, the processor can ascertain the received beef quality.

Figure 20:
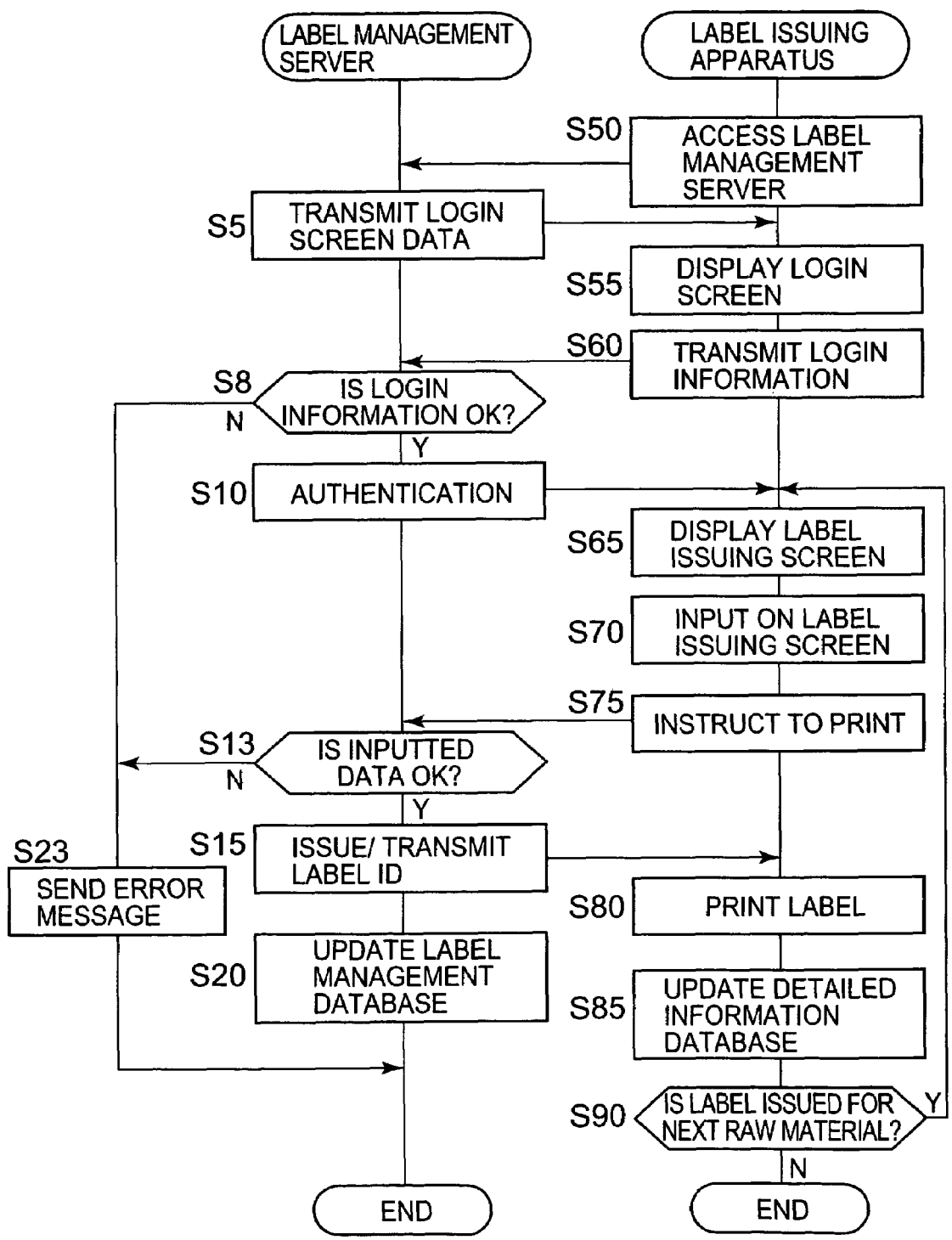
FIG. 20 is a flowchart illustrative of a procedure of printing a label ID.

FIG. 20 is a flowchart illustrative of a procedure of printing the label ID with the label issuing apparatus (label issuing apparatus 5*a*) provided for the step from which a series of processings is started.

The following operations are performed by the CPU 41 according to the label ID management program in the label management server 2 and by the CPU 15 according to the label issuing program 33 in the label issuing apparatus 5*a*.

First, the label issuing apparatus 5*a* accesses the label management server 2 (step S50).

In response to the operation, the label management server 2 transmits the login screen data to the label issuing apparatus 5*a* (step S5).

The label issuing apparatus 5*a* receives the login screen data to display the login screen on the display unit 19 (step S55).

The operator inputs the user ID, password, etc., on the displayed login screen to transmit the login information to the label management server 2 (step S60). The login information includes the user ID and password as well as the label issuing apparatus ID of the label issuing apparatus 5*a*, so that the label management server 2 can identify the label issuing apparatus.

The label management server 2 receives the login information from the label issuing apparatus 5*a*, checks the received information against information stored in the label issuing apparatus database 56, and judges the validity of the login information (step S8).

In the case of the valid login information (step S8: Y), the label management server 2 authenticates the label issuing apparatus 5*a* and sends a signal to that effect to the label issuing apparatus 5*a* (step S10).

In the case of the invalid login information (step S8: N), the label management server 2 sends an error message to the label issuing apparatus 5*a* (step S23) to end the processing. In the label issuing apparatus 5*a*, the error message is displayed and the label printing is not carried out.

In the case where the label issuing apparatus 5*a* is authenticated in step S10, the label issuing apparatus 5*a* receives this signal to confirm that the apparatus is authenticated and display the label issuing screen 68 (step S65).

The operator inputs necessary information on the label issuing screen 68 (step S70), and clicks on a "print" button 69 to issue a print instruction (step S75). Then, the information input on the label issuing screen 68 is transmitted to the label management server 2 from the label issuing apparatus 5*a*.

The label management server 2 receives the input information from the label issuing apparatus 5*a*, and checks whether or not there is any erroneously input information (step S13). In this embodiment, the label management server 2 has a foolproof function and, for example, checks a human error such as input impossible numeric value.

If there is no error in input information (step S13: Y), the label management server 2 issues and transmits a label ID to the label issuing apparatus 5*a* (step S15). Then, the issued label ID is stored in the label ID management database 55 to update the database (step S20).

The label issuing apparatus 5*a* receives the label ID from the label management server 2 and uses the label ID to print the label (step S80).

If there is any error in input information received from the label issuing apparatus 5*a* (step S13: N), the label management server 2 sends an error message to the label issuing apparatus 5*a* (step S23) to end the processing.

Next, the label issuing apparatus 5*a* stores the label ID and the detailed information input on the label issuing screen in the detailed information database 36 in association with each other to update the database (step S85).

If the label issuing apparatus 5 continues to issue the next label (step S90: Y), the process returns to step S65; if not issuing the label anymore (step S90: N), the operator logs out to end the processing.

Figure 21:
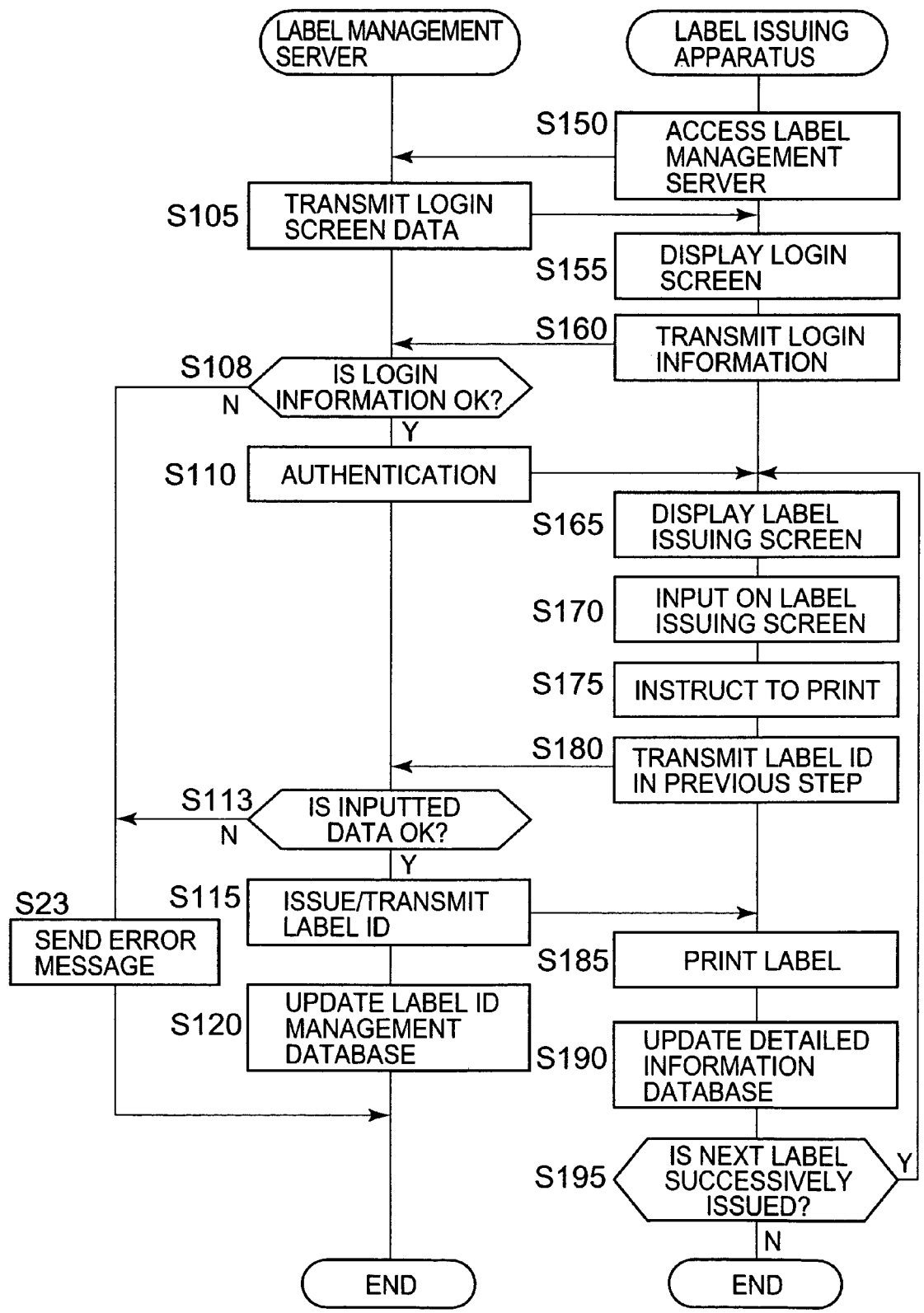
FIG. 21 is a flowchart illustrative of a procedure of printing a label ID.

FIG. 21 is a flowchart illustrative of a procedure of printing the label ID with the label issuing apparatuses (label issuing apparatuses 5b to 5e) provided for each step subsequent to the first step (starting point). Here, an explanation will be given using the label issuing apparatus 5b as an example.

First, the operator of the label issuing apparatus 5b accesses the label management server 2 (step S150). A subsequent series of steps up to step S110 are the same as steps up to step S10 of FIG. 20 and thus a description thereof is omitted here.

When the label management server 2 authenticates the label issuing apparatus 5b, the label issuing apparatus 5b displays the label issuing screen 70 (step S165).

The operator inputs necessary information on the label issuing screen 70. At this time, the label ID printed on the label affixed on the beef product arrived from the producer is input (step S170).

The operator next clicks on a "print label" button 71 to issue a print instruction (step S175).

The label issuing apparatus 5b accordingly transmits the information (including the label ID) input on the label issuing screen 70 to the label management server 2 and requests the issuance of the label ID from the label management server 2 (step S180).

The label management server 2 receives the input information from the label issuing apparatus 5b and checks the input information by means of the foolproof function (step S113).

This check is aimed to not only check impossible numerical value, for example, but also check the request for issuance of the unauthorized label ID such as checking whether or not a received label ID was issued in the past, checking the number of times the label ID was transmitted in the past, and checking whether or not the number of times falls within an appropriate range.

When the check result reveals that the input information is valid (step S113: Y), the label management server 2 issues and transmits the label ID to the label issuing apparatus 5b (step S115) The label ID received from the label issuing apparatus 5b and the label ID issued this time are stored in the label ID management database 55 in association with each other to update the database (step S120).

When the check result reveals that the input information received from the label issuing apparatus 5b is invalid (step S113: N), the label management server 2 sends an error message to the label issuing apparatus 5b (step S23) to end the processing.

In the case of the valid input information, the label issuing apparatus 5b receives the label ID from the label management server 2 to print the label ID on the label (step S185). The printed label is affixed on the processed product.

Next, the label issuing apparatus 5b stores information input on the label issuing screen 70 as detailed information in association with the printed label ID in the detailed information database 36 to update the database (step S190).

If the label issuing apparatus 5b continues to issue the next label (step S195: Y), the process returns to step S165; if the printing operation is ended (step S195: N), the operator logs out to end the processing.

Figure 22:
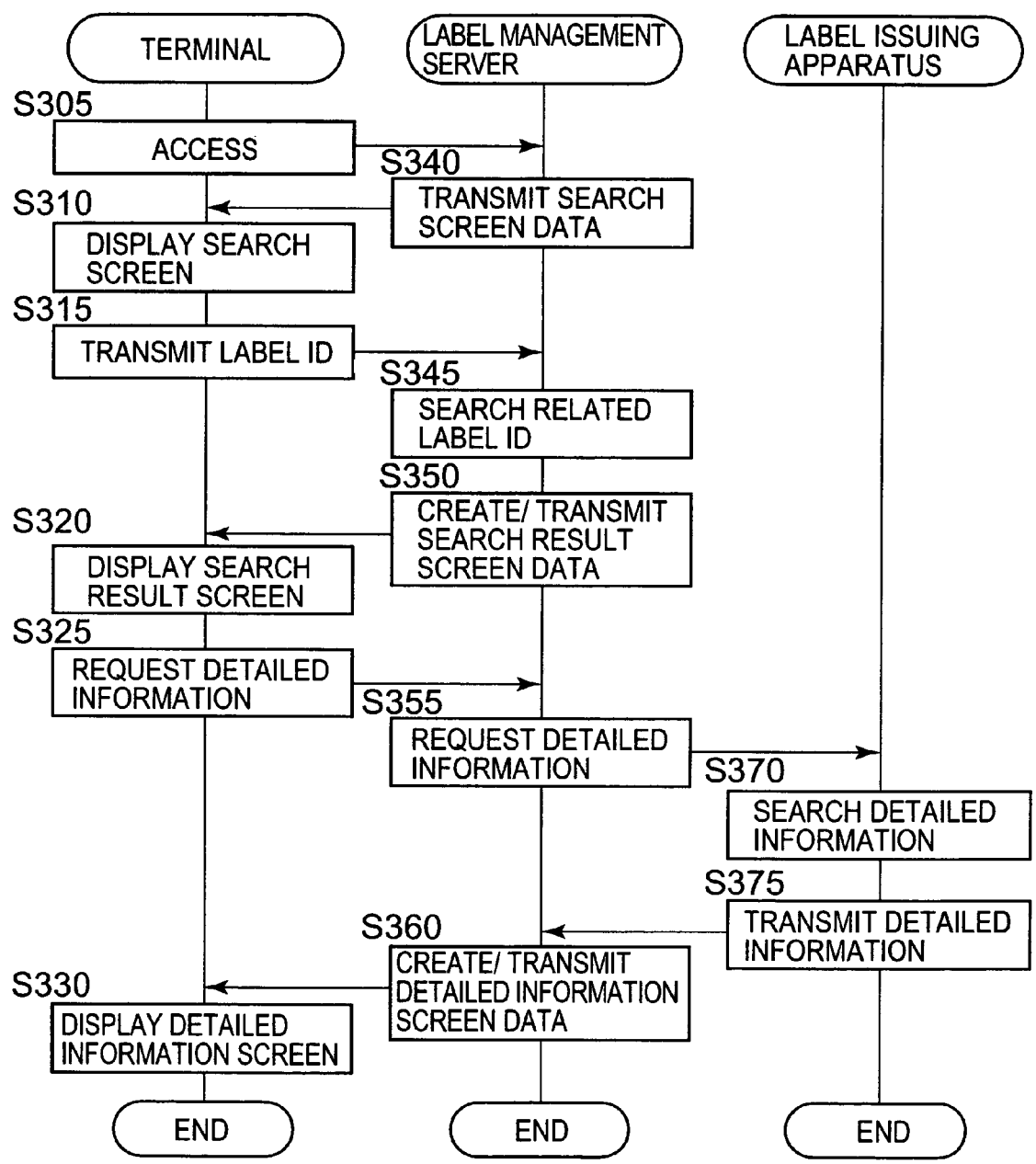
FIG. 22 is a flowchart illustrative of a procedure of searching a food production history.

FIG. 22 is a flowchart illustrative of a procedure of searching a food production history.

First, the user (consumer, processor, etc.) operating the terminal 4 accesses the label management server 2 (step S305).

The label management server 2 transmits in return search screen data to the terminal 4 (step S340).

The terminal 4 receives the search screen data from the label management server 2 to display the search screen on the display device (step S310).

The user inputs the label ID displayed on the search screen to transmit the data to the label management server 2 (step S315).

The label management server 2 receives the label ID and searches the label ID management database 55 for the label ID concerned and label IDs related to the label ID concerned in history (step S345).

Next, the label management server 2 uses the searched label ID to create and transmit search result screen data to the terminal 4 (step S350).

The terminal 4 receives the search result screen data from the label management server 2 to display the search result screen on the display device (step S320).

If the user makes a request to browse the detailed information (step S325), the label management server 2 transmits the searched label ID to the label issuing apparatus 5 that prints the label ID concerned and requests the apparatus to transmit the detailed information related to the label ID concerned (step S355).

Each label issuing apparatus 5 searches, in response to the request, the detailed information database 36 for the detailed information related to the label ID received from the label management server 2 (step S370), and transmits the search result to the label management server 2 (step S375).

The label management server 2 receives the detailed information from each label issuing apparatus 5, and creates and transmits detailed information screen data to the terminal 4 (step S360). Here, when the user requests the outlined information and the detailed information, the "outlined" detailed information screen data and the "detailed" detailed information screen data are created, respectively.

The terminal 4 receives the detailed information screen data from the label management server 2 and uses the data to display a detailed information screen (step S330).

In this embodiment as described above, the following effects can be produced.

(1) The label IDs are issued in association with one another in a series of steps, whereby the label is imparted with traceability (tracing function) for a product history.

(2) When the new label is issued, the label is issued in association with the label ID in the previous step, whereby it is possible to prevent the label with incorrect indication or deceptive label from being issued. Therefore, high accuracy in label indication is ensured.

(3) The correct content indication is obliged, whereby it is possible to avoid such a situation that top-brand beef is blended with no-brand beef to increase the total weight or the beef as is top-brand one but is stored in unsuitable condition and begins to go bad is put on the market. As a result, the reliability of the brands can be maintained. The same holds for other fresh foods than beef.

(4) The consumer, processor, retailer, etc., can easily browse the product history via the Internet 3.

(5) The detailed information is managed in each label issuing apparatus 5, whereby a load on the label management server 2 is lessened.

(6) The use condition of each label issuing apparatus 5 can be grasped by the label management server 2, whereby a toll can be collected according to frequency of use of each label issuing apparatus 5 to achieve running cost reduction.

(7) The use condition of the label issuing apparatus 5 is monitored to perform maintenance and replenish expendables as appropriate and ensure the usability for the user. Also, it is possible to prevent any system breakdown and deteriorated print quality due to pirated expendables, allowing the user to feel secure about the system.

MODIFIED EXAMPLE 1

In the above embodiment, the detailed information is managed in each label issuing apparatus 5 but may be managed in the label management server 2 as well.

In this case, when requesting the label ID from the label management server 2, the label issuing apparatus 5 transmits the detailed information to the label management server 2 and the label management server 2 receives the detailed information to issue the label ID. The label ID is stored in association with the detailed information.

When the label management server 2 manages the detailed information, the input detailed information is hardly tampered.

MODIFIED EXAMPLE 2

In the above embodiment, when the user operating the terminal 4 requests the detailed information on the search result screen, the label management server 2 collects the detailed information from each label issuing apparatus 5. However, this may be modified such that the user selects the label ID and then the detailed information is transmitted from the corresponding label issuing apparatus 5 to the terminal 4.

In such a case, URL of the corresponding label issuing apparatus 5 is previously embedded in the label ID displayed on the search result screen as a link destination. Then, the user selects the label ID to jump to the Web site set up by the label issuing apparatus 5 and the label ID is transmitted from the terminal 4 to the label issuing apparatus 5 as a parameter.

In this case, the label issuing apparatus 5 receives the label ID from the terminal 4 to search and transmit the detailed information to the terminal 4.

MODIFIED EXAMPLE 3

In order to prevent tampering of the detailed information stored in each label issuing apparatus 5, the detailed information may be hashed upon issuing the label ID and a digest message may be stored by the label management server 2 in association with the label ID.

The term "hashed" means that a string (digest message) is created from an electronic document using a function called a hash function.

The same digest message can be obtained from the same electronic document. If even a part of the electronic document is modified, the digest message of this document differs from the one before modification.

Therefore, the digest message of the detailed information stored in the label issuing apparatus 5 and the digest message (hash value) stored in the label management server 2 are compared with each other, so that whether or not the detailed information stored in the label issuing apparatus 5 is tampered can be checked. Also, the digest message requires only small data volume, and thus places a small load on the label management server 2 when in storage.

In this way, the digest message constitutes modification detection information whose value is changed when the detailed information is modified, and also a module for hashing the detailed information constitutes detection information creation means.

Using the hash function facilitates check as to whether or not the displayed detailed information is tampered/falsified, offering a deterrent effect against falsification of the detailed information. Therefore, the safety of the beef is ensured and the user and consumer can feel secure about the indication.

Also, the detailed information is input with the label issuing apparatus 5, after which the detailed information may be locked not to allow the change and additional input.

MODIFIED EXAMPLE 4

A monitoring server for monitoring each label issuing apparatus 5 is set on the Internet 3 to monitor whether or not there is any corruption.

The server checks whether or not the total weight of the produced beef product in the downstream step is within the total weight of the one produced in the upstream step or monitors where or not a specific label ID is abused as the label ID in the previous step.

MODIFIED EXAMPLE 5

In this embodiment, the label IDs are printed on the label so as to prevent duplication of the label ID but may be printed while allowing the duplication to some degree.

For example, it is assumed that three beef products are produced under the same condition from beef with a label ID-A and the same label printed with a label ID-B is affixed to each beef product.

Such a label issuing method is applicable within a range as gives no influence on the product quality preservation. Also, this method eliminates the need to issue the label IDs for the individual labels, so that the load on the label management server 2 and the label issuing apparatuses 5 can be reduced.

As mentioned above, in the case of printing the label ID in a duplicated manner, the number of duplications is transmitted to the label management server 2 to allow the label management server 2 to grasp how many label IDs are used.

Also, it is possible to combine the method of issuing the individual label IDs to all the products produced in the same step with the method of issuing the same label ID thereto.

For example, the individual label IDs may be issued to all the products in middle steps and the same label ID may be issued at the stage of retail product.

The more downstream steps involve a larger number of products, so that the individual label IDs are issued in the upstream steps and the same label ID is issued in the downstream steps. With such a structure, the load on the label management server 2 is small and the consumer can acquire necessary information.

MODIFIED EXAMPLE 6

In the above embodiment, the history of the label ID is managed in the label management server 2, but may be managed in each label issuing apparatus 5 in a distributed manner.

In this case, each label issuing apparatus 5 stores the label ID printed in the previous step in association with the label ID printed in the present step. The label ID printed in the present step and the label ID in the previous step associated with the label ID concerned are searched in each label issuing apparatus 5, thereby offering the history of a series of label IDs.

For example, it is assumed that the label issuing apparatus 5*a* prints a label A, the label issuing apparatus 5*b* prints a label B in association with the label A, and the label issuing apparatus 5*c* prints a label C in association with the label B. The label issuing apparatuses 5*a*, 5*b*, and 5*c* store the label IDs in such a way that associates the label ID in the previous step with the label ID in the present step, like "A", "A-B", and "B-C", for example.

With the label issuing apparatuses 5, collecting those pieces of information from the label issuing apparatuses 5a, 5b, and 5c and tracing the association therebetween provide the history of "A→B→C".

In this modified example, the label management server 2 having a function of issuing the label ID and a function of searching the label ID in each label issuing apparatus 5 can obtain the history of the label IDs to considerably diminish the load on the label management server 2.

Further, if the hash value of the detailed information mentioned in Modified Example 3 is stored in association with the issued label ID, the tampered detailed information in the label issuing apparatuses 5 can be detected as well.

MODIFIED EXAMPLE 7

In recent years, an IC tag has been widely used. The label discussed in the above embodiment or each modified example can be produced by use of an IC tag.

That is, the label ID is stored in an IC tag and the IC tag is attached to the product. In this way, the IC tag having a label ID stored therein can be used like the label.

A label management system of this modified example is provided with an IC tag issuing apparatus in place of the label issuing apparatuses 5a to 5e in the label management system 1 (refer to FIG. 2) and uses an IC tag in place of the label.

The IC tag is constituted by a minute semiconductor circuit provided with a storage device and can electronically store digitized data (digital data).

Further, the IC tag includes an antenna that enables close-range radio communication with an input/output device called a reader/writer.

Furthermore, a predetermined command is input to the IC tag, whereby the digital data stored in the storage device can be read out or the digital data can be written to the storage device.

As mentioned above, the IC tag allows writing and reading of the digital data. Hence, the IC tag stores various kinds of information such as the label ID or item number as discussed in this embodiment, or other such information and thus can be used like the label.

The IC tag is put on an adhesive material such as paper applied with adhesives, for example, and can be affixed to the target together with the adhesive material. Thus, the IC tag can be attached to the target.

Also, the IC tag can be attached to the target instead of affixing the tag, by binding the IC tag and the target together with a rope-like member.

Figure 23:
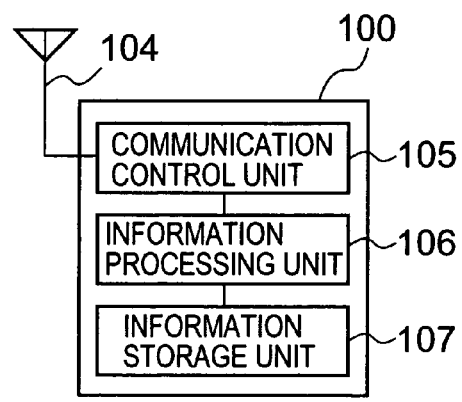
FIG. 23 is a block diagram illustrative of a functional configuration of an IC tag.

FIG. 23 is a block diagram illustrative of a functional configuration of the IC tag.

Components of an IC tag 100 include an antenna 104, a communication control unit 105, an information processing unit 106, and an information storage unit 107.

The antenna 104 is an element for transmitting and receiving a radio wave to/from a reader/writer (not shown). An electric power (radio wave) necessary for driving the IC tag 100 is supplied by radio from the reader/writer and the antenna 104 has the function of receiving the radio wave and generating power.

The communication control unit 105 is a functional part for controlling the radio communication and exchanges information with the reader/writer via the antenna 104.

More specifically, in the case of writing a label ID to the IC tag 100, a write command is received from the reader/writer to output the data to the information processing unit 106. In the case of reading a label ID, a read command is received from the reader/writer to output the data to the information processing unit 106 and a label ID output from the information processing unit 106 in return is transmitted to the reader/writer.

The information processing unit 106 allows input of each command such as a write command or read command, and carries out information processing specified based on those commands.

In this modified example, for example, the write command is executed to write a label ID specified based on a parameter of the write command to the information storage unit 107 or the read command is executed to read and output the label ID stored in the information storage unit 107.to the communication control unit 105.

The information storage unit 107 is a non-volatile random access memory, for example, electrically erasable and programmable ROM (EEPROM) and stores the label ID in this modified example.

Figure 24:
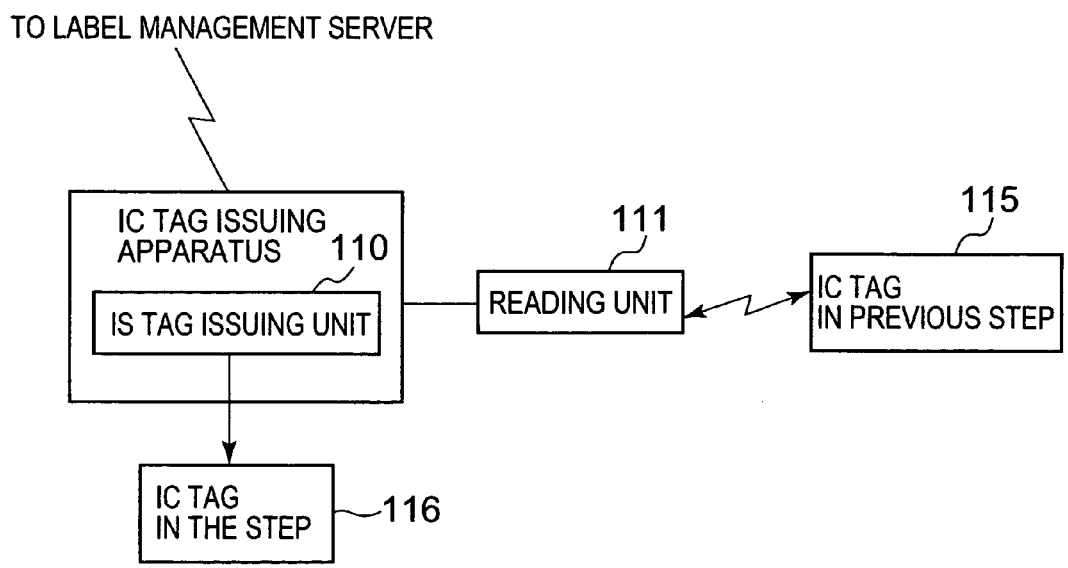
FIG. 24 is a block diagram illustrative of a structure of an IC tag issuing apparatus.

FIG. 24 is a block diagram illustrative of a structure of an IC tag issuing apparatus according to this modified example. The IC tag issuing apparatus corresponds to each label issuing apparatus 5 of this embodiment as mentioned above, and has the same function as each label issuing apparatus 5 except that a recording medium for recording a label ID (identification information) is an IC tag.

A reader unit 111 is a reader/writer used for reading a label ID in the previous step from an IC tag 115 attached to the product in the previous step.

The reader unit 111 is composed of a handy reader/writer removably connected with the IC tag issuing apparatus through a signal cable, for example. The operator brings the reader unit 111 closer to the IC tag 115 to read the label ID.

The label ID that the reader unit 111 has read from the IC tag 115 is input to the IC tag issuing apparatus.

The IC tag issuing apparatus transmits the label ID thus read from the IC tag 115 to the label management server 2 to receive a label ID related to the transmitted one from the label management server 2.

An IC tag issuing unit 110 is a reader/writer for issuing an IC tag 116 in the present step and writes the label ID in the present step received from the label management server 2 to the IC tag 116.

The IC tag issuing unit 110 writes the label ID to the IC tag 116 and then sends out the IC tag to the outside of the IC tag issuing apparatus through an extraction port.

The IC tag 116 in the present step is affixed to the adhesive material and the operator attaches the IC tag 116 onto the product of the present step together with the adhesive material.

As mentioned above, the IC tag issuing apparatus of this modified example transmits the label ID read from the IC tag 115 in the previous step to the label management server 2 via the Internet 3. The label management server 2 transmits in return the label ID for the present step. The label ID can be stored in the IC tag 116 of the present step.

Figure 25:
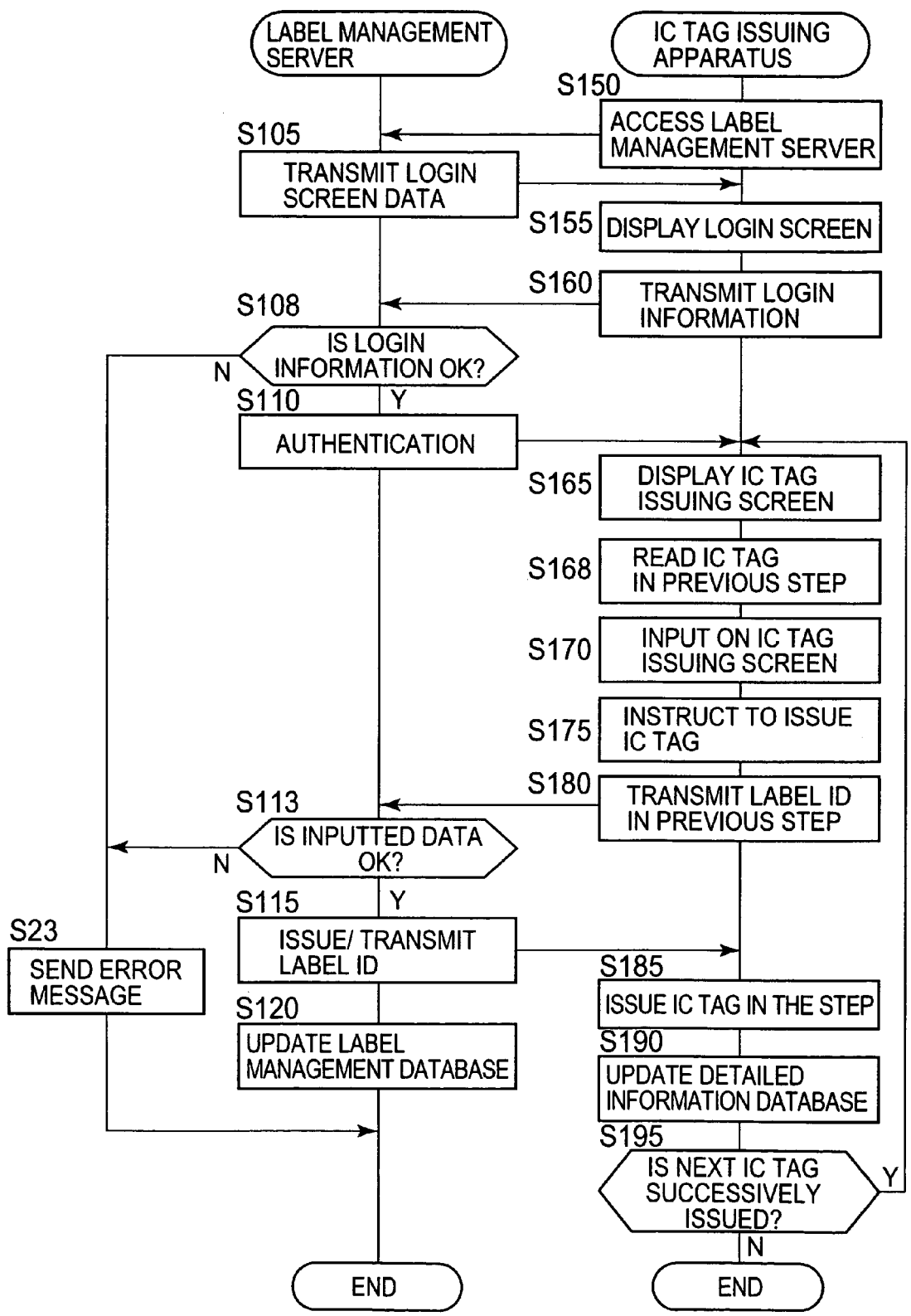
FIG. 25 is a flowchart illustrative of a procedure of issuing a label ID with the IC tag issuing apparatus.

FIG. 25 is a flowchart illustrative of a procedure for issuing a label ID with the IC tag issuing apparatus of this modified example. The flowchart illustrates a procedure in steps subsequent to the first step (starting point) and corresponds to FIG. 21. Thus, the same steps as those of FIG. 21 are given the same step numbers and their description is outlined or omitted.

Steps S150 to S110 are the same as those of the aforementioned embodiment.

When the IC tag issuing apparatus is authenticated by the label management server 2, an IC tag issuing screen is displayed (step S165).

The IC tag issuing screen is similar to the label issuing screen 70 (FIG. 12) and an "issue IC tag" button is displayed in place of the "print label" button 71.

Next, the operator brings the reader unit 111 closer to the IC tag 115 in the previous step to read a label ID in the previous step (step S168)

The read label ID is input to the IC tag issuing apparatus and is automatically input to the box for the item "label ID in previous step" on the IC tag issuing screen.

The operator inputs necessary information (detailed information) in the boxes for other items on the IC tag issuing screen (step S170). The input necessary information is stored in the IC tag issuing apparatus.

This is achieved by detailed information inputting means and detailed information storage means of the IC tag issuing apparatus.

Next, the operator clicks on the "issue IC tag" button to issue an IC tag issuance instruction (step S175).

In response to the IC tag issuance instruction, the IC tag issuing apparatus transmits to the label management server 2 the information (including the label ID in the previous step) input on the IC tag issuing screen and requests the label management server 2 to issue a label ID (step S180). This is achieved by identification information transmitting means of the IC tag issuing apparatus.

The label management server 2 receives the input information from the IC tag issuing apparatus and checks the input information by means of a foolproof function (step S113).

In the case where the input information received from the IC tag issuing apparatus is judged invalid (step S113: N), the label management server 2 sends an error message to the IC tag issuing apparatus (step S23) to end the processing.

If the check result confirms that the input information is valid (step 113: Y), the label management server 2 issues and transmits a label ID to the IC tag issuing apparatus (step S115).

Then, the label ID received from the IC tag issuing apparatus and the label ID issued this time are stored in the label ID management database 55 in association with each other to update the database (step S120).

The IC tag issuing apparatus receives the label ID from the label management server 2 to write the ID to the IC tag 116 in the present step and issue the IC tag 116 in the present step (step S185).

This is achieved by identification information receiving means and recording means of the IC tag issuing apparatus.

The issued IC tag 116 in the present step is attached to the processed product by an operator.

Next, the IC tag issuing apparatus sets the information input on the label issuing screen as detailed information and stores the information in association with the printed label ID in the detailed information database to update the database (step S190). Note that as in the embodiment mentioned above, the IC tag issuing apparatus transmits the detailed information to the label management server 2 in response to a request from the label management server 2.

When the IC tag issuing apparatus issues the next IC tag without pause (step S195: Y), the process returns to step S165 to continue the processing for issuing IC tags; if not issuing the IC tags anymore (step S195: N), the operator logs out to end the processing.

Given above is an explanation of the processing for the steps subsequent to the first step (starting point) corresponding to FIG. 21. The IC tag issuing apparatus provided for the step from which a series of processings is started may have the same structure as the label issuing apparatus of FIG. 20.

As described above, in this modified example, the IC tag can be used in place of the printed label.

Then, the label ID is read by radio from the IC tag 115 in the previous step, thereby preventing the human error.

Also, the IC tag is hard to counterfeit or modify to thereby raise the security level of the label management system.

In this modified example, only one label ID is stored in the IC tag 100, but the plural IDs may be stored.

Thus, the label ID in the present step can be additionally stored in the IC tag 115 that has stored the label ID in the previous step.

As mentioned above, the addition of the label ID in the present step allows the reuse of the IC tag 115 issued in the pervious step, leading to cost reduction.

MODIFIED EXAMPLE 8

In this modified example, a description is directed to the case where a system using a semiconductor circuit such as an IC tag as a recording medium for recording a label ID (identification information) and a system using a print medium such as paper or resin are used in cooperation.

The IC tag lowers its price due to recent widespread use thereof, but is more expensive than any conventional print medium. If the IC tag is used to realize the traceability from the upstream end to the downstream end in the distribution line, the IC tag may cost high.

As one possible countermeasure against this, the IC tag is used for the upstream steps involving fewer products, while the label is used for the downstream steps involving more products.

To that end, in this modified example, it is assumed that the IC tag is used for the upstream steps and the label is used for the downstream step.

Figure 26:
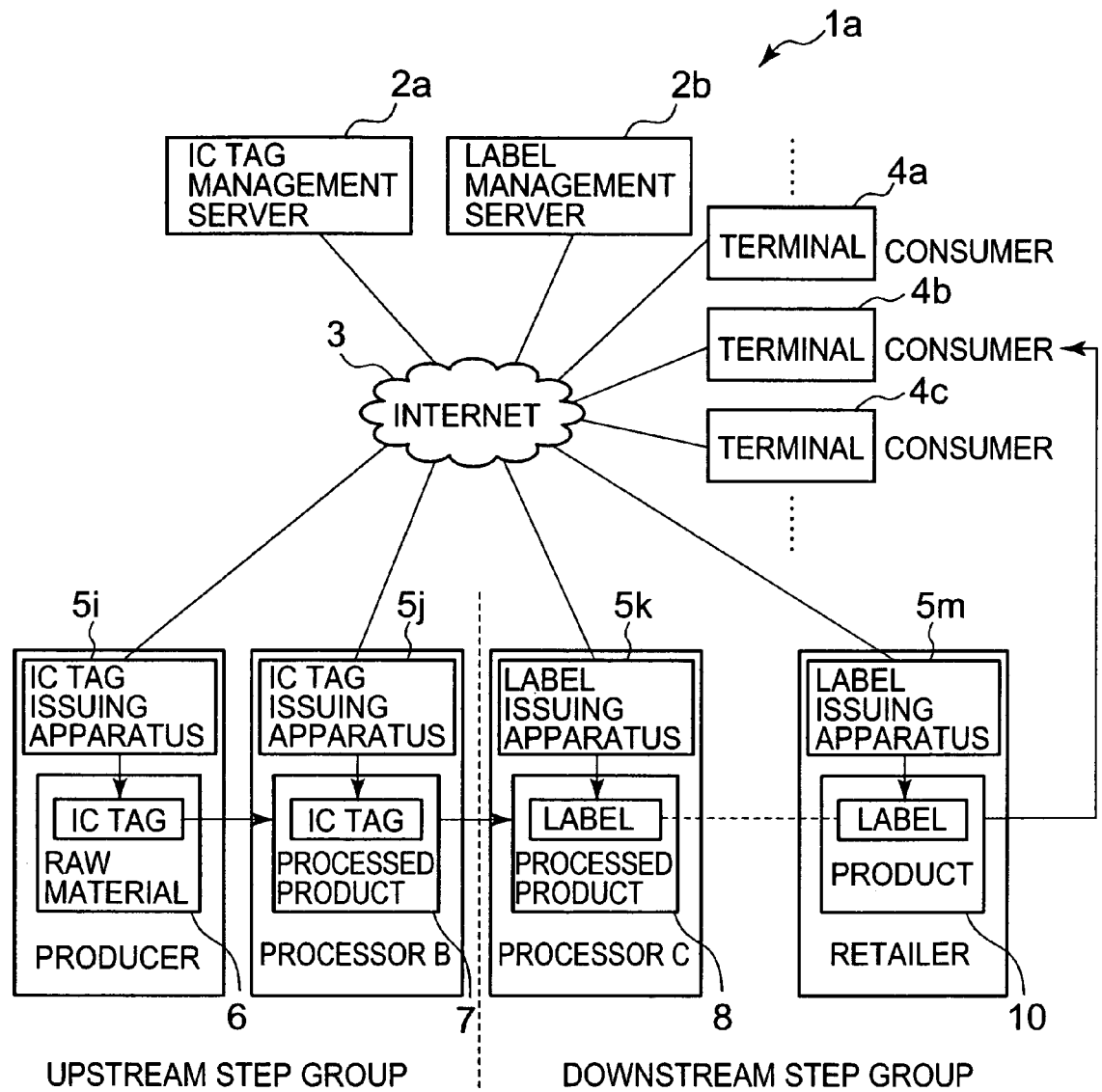
FIG. 26 is a conceptual diagram showing a network configuration of a label management system in Modified Example 8.

FIG. 26 is a conceptual diagram showing a network configuration of a label management system 1*a* of this modified example.

The label management system 1*a* includes an IC tag management server 2*a*, a label management server 2*b*, terminals 4*a*, 4*b*, 4*c*, . . . , IC tag issuing apparatuses 5*i* and 5*j*, and label issuing apparatuses 5*k* to 5*m*, which are connectable with one another via the Internet 3.

The IC tag management server 2*a* manages the history of label IDs issued by the IC tag issuing apparatuses 5*i* and 5*j* and the label management server 2*b* manages the history of label IDs issued by the label issuing apparatuses 5*k* to 5*m*.

Therefore, the label management system 1*a* is regarded as being composed of a subsystem including the IC tag management server 2*a* and the IC tag issuing apparatuses 5*i* and 5*j* and a subsystem including the label management server 2*b* and the label issuing apparatuses 5*k* to 5*m*.

In the label management system 1*a*, a producer and a processor B in an upstream step group use the IC tag for giving the product the label ID and have the IC tag issuing apparatuses 5*i* and 5*j*, respectively.

The producer produces the IC tag having the label ID for the first step (starting point) stored therein by using the IC tag issuing apparatus 5*i* and attaches the IC tag to a raw material 6.

Then, the processor B receives the raw material 6 from the producer to process the material into a processed product 7, and attaches to the processed product 7 the IC tag issued with the IC tag issuing apparatus 5*j*.

The structures of the IC tag issuing apparatuses 5i and 5j are the same as the IC tag issuing apparatus as described in Modified Example 7.

The IC tag management server 2a manages the history relation (history information) of the IC tags issued by the IC tag issuing apparatuses 5i and 5j and has the same structure as the label management server 2 in the above embodiment except that the management target is an IC tag.

In short, the IC tag management server 2a issues a label ID for the first step (starting point) to the IC tag issuing apparatus 5i and issues and transmits to the IC tag issuing apparatus 5j, after receiving the label ID in the previous step, a label ID in association with the received label ID.

On the other hand, in the label management system 1a, a processor C, . . . , and a retailer in a downstream step group use the label issuing apparatuses 5k to 5m similar to the label issuing apparatus in the above embodiment.

Note that the label issuing apparatus 5k provided in the leading step in the downstream step group is provided with a reader/writer for reading a label ID since the label ID in the previous step is stored in the IC tag.

The label management server 2b has the same structure as the label management server 2 in the above embodiment.

Also, although described later in detail, the IC tag management server 2a and the label management server 2b are configured so as to communicate with each other. The label management server 2b can trace the history of a product 10 to the upstream step where the IC tag management server 2a takes over the search for the history to trace the history to further upstream step.

Then, the IC tag management server 2a can collect the detailed information from the IC tag issuing apparatuses 5i and 5j and the label management server 2b can collect the detailed information from the label issuing apparatuses 5k to 5m. The IC tag management server 2a and the label management server 2b also communicate with each other to cover detailed information from the raw material 6 to the product 10 in cooperation.

Figure 27:
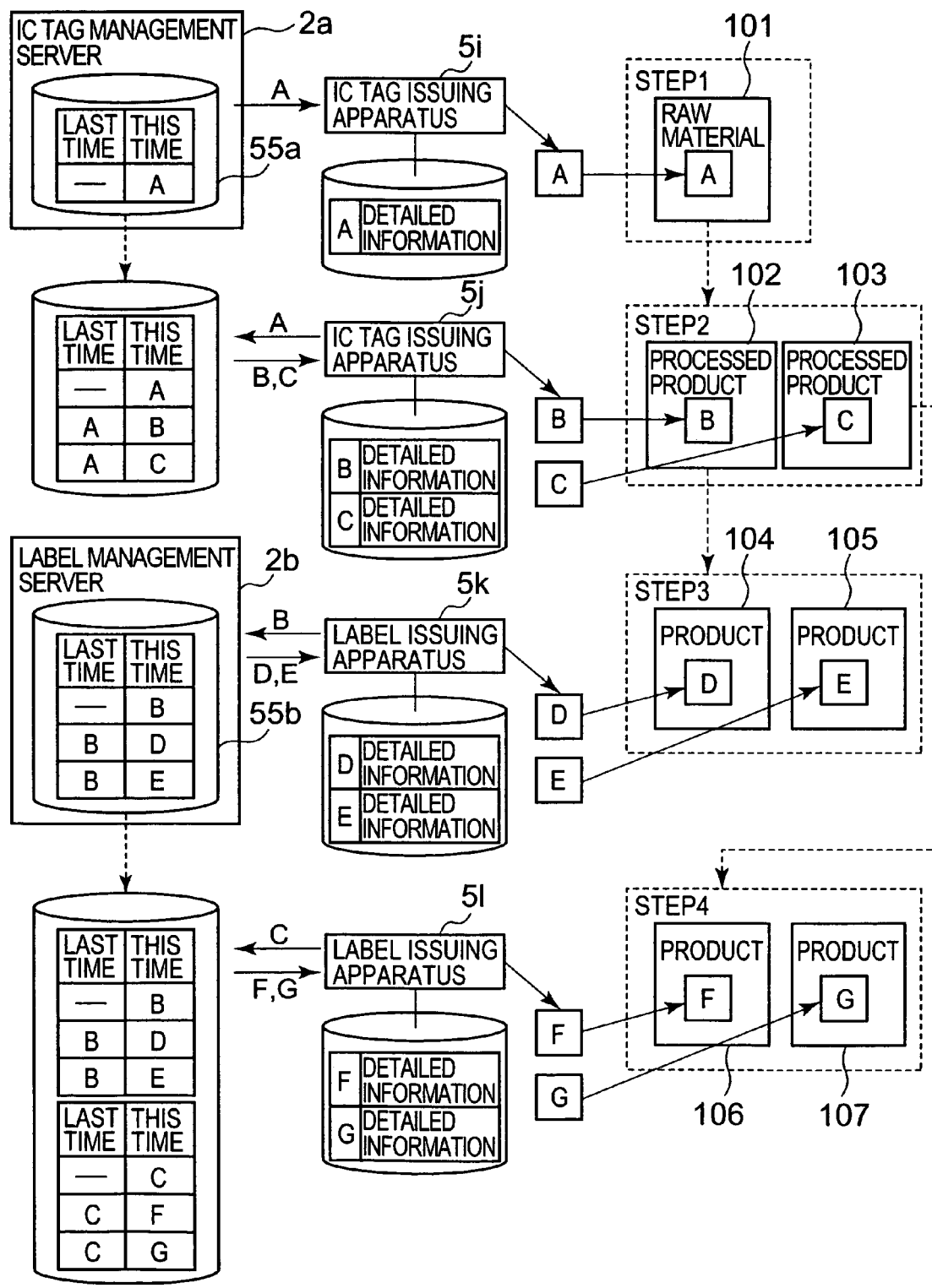
FIG. 27 illustrates how to manage a history of a product in Modified Example 8.

FIG. 27 illustrates how to manage the history of the product in the label management system 1a with the IC tag having the label ID stored therein and the label printed with the label ID.

The IC tag management server 2a first issues a label ID (A) (hereinafter referred to as "label ID-A") unique to step S1 from which a series of processings is stared and transmits the ID to the IC tag issuing apparatus 5i. Then, the label ID-A is stored in a label ID management database 55a provided in the IC tag management server 2a.

The IC tag issuing apparatus 5i receives the label ID-A from the IC tag management server 2a and writes the label ID-A to the IC tag. The IC tag having the label ID-A stored therein is attached to the raw material 101 by the operator.

At this time, the operator inputs the detailed information related to the raw material 101 in the IC tag issuing apparatus 5i and the IC tag issuing apparatus 5i stores the label ID-A in association with the detailed information.

Next, the raw material 101 is shipped for step S2 and processed products 102 and 103 are produced from the material.

In step S2, the label ID-A stored in the IC tag of the raw material 101 is read by the reader/writer in the IC tag issuing apparatus 5j and transmitted to the IC tag management server 2a.

The IC tag management server 2a receives the label ID-A and issues and transmits to the IC tag issuing apparatus 5j a label ID-B and a label ID-C unique to the processed products 102 and 103, respectively. Further, the IC tag issuing apparatus 5j stores the label ID-B and the label ID-C in association with the label ID-A received beforehand in the label ID management database 55a.

The IC tag issuing apparatus 5j writes the label ID-B and the label ID-C transmitted from the IC tag management server 2a to the IC tag. The IC tag having the label ID-B written thereto and the IC tag having the label ID-C written thereto are attached to the processed products 102 and 103, respectively and transferred to the next step.

Also, the IC tag issuing apparatus 5j stores the detailed information that the operator has input with respect to the processed products 102 and 103, in association with the label ID-B and the label ID-C, respectively.

Next, the processed product 102 is transferred to step S3 and then products 104 and 105 are produced.

In step S3, the label issuing apparatus 5k reads the label ID-B stored in the IC tag for the processed product 102 with the reader/writer and transmits the read label ID to the label management server 2b.

The label management server 2b stores the label ID-B in the label ID management database 55b as well as issues a label ID-D and a label ID-E which are unique to the products 104 and 105 produced in this step, respectively. The label management server 2b transmits to the label issuing apparatus 5k the label ID-D and the label ID-E as well as stores the label IDs in association with the label ID-B in the label ID management database 55b in the label management server 2b.

The label issuing apparatus 5k prints the label ID-D and the label ID-E transmitted from the label management server 2b on the label. The printed labels are affixed on the products 104 and 105, respectively and the products 104 and 105 are retailed to consumers.

Also, the label issuing apparatus 5k stores detailed information input with respect to the products 104 and 105 in association with the label ID-D and the label ID-E, respectively.

On the other hand, the processed product 103 produced in step S2 is transferred to step S4 and products 106 and 107 are produced by using the processed product 103.

Similar to step S3, the label issuing apparatus 51 reads the label ID-C stored in the IC tag of the processed product 103 by using the reader/writer and transmits the read ID-C to the label management server 2b. Then, a label ID-F and a label ID-G transmitted from the label management server 2b are printed. Those labels are affixed on the products 106 and 107.

Also, the label management server 2b stores detailed information related to the product 104 and detailed information related to the product 105 in association with the label ID-F and the label ID-G, respectively.

The label management server 2b issues the label ID-F and the label ID-G transmitted from the label issuing apparatus 51, which are unique to the label ID-C, and stores the label ID-F and the label ID-G in association with the label ID-C in the label ID management database 55b.

Figure 28:
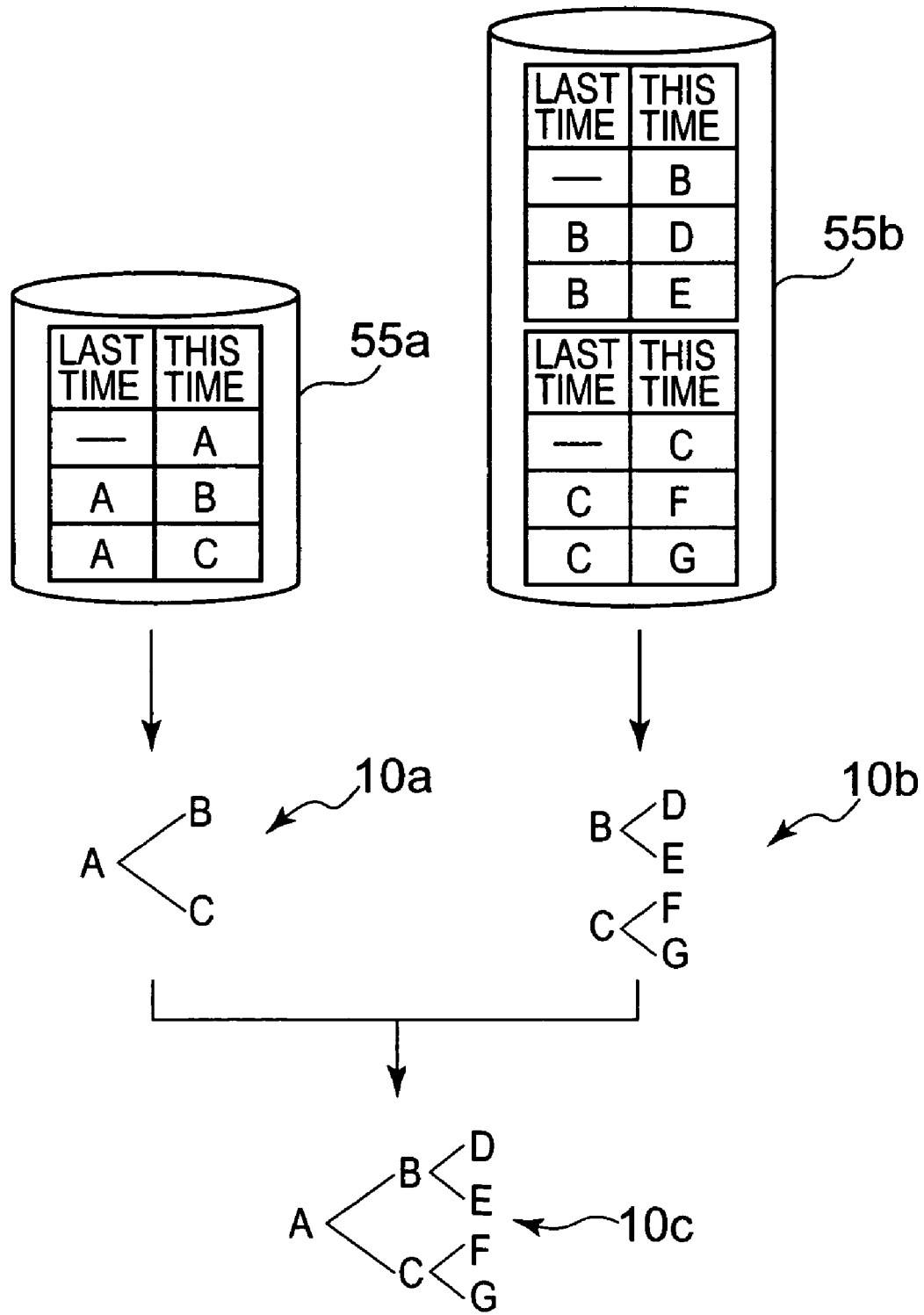
FIG. 28 illustrates a history of label IDs stored in an IC tag management server and a label management server.

In the above process, the history of the label IDs stored in the IC tag management server 2a and the label management server 2b is as shown in FIG. 28.

The label ID management database 55a of the IC tag management server 2a stores the history of the label IDs with the IC tags as shown in a genealogical tree 10a. That is, the label ID-A is associated with the label ID-B and the label ID-C.

On the other hand, the history of the label IDs with the labels is stored in the label ID management database 55b of the label management server 2b as shown in a genealogical tree 10b. That is, the label ID-B is associated with the label ID-D and the label ID-E and the label ID-C is associated with the label ID-F and the label ID-G.

Here, a genealogical tree 10c is obtained by combining the genealogical tree 10a and the genealogical tree 10b in theory. Thus, the entire history of the product from the raw material 101 through the products 104 to 107 can be grasped.

As mentioned above, the IC tag management server 2a and the label management server 2b each constitute a product history management apparatus, including: identification information receiving means for receiving from one of identification information issuing apparatuses (IC tag issuing apparatuses or label issuing apparatuses) provided at least for each of partially continuous steps (step of using an IC tag or step of using a label) identification information (label ID) recorded on a recording medium (IC tag or label) attached in a step immediately preceding the step where the corresponding identification information issuing apparatus is provided; identification information transmitting means for issuing new identification information relative to the received identification information and transmitting the issued identification information to the identification information issuing apparatus; and identification information storage means for storing the transmitted identification information in association with the received identification information in the immediately preceding step.

In this way, as for the continuous steps on the upstream side (step of using the IC tag) and downstream steps next to the steps concerned (step of using the label), a label ID issued in the lowermost step of the upstream step group and a label ID (hereinafter, referred to as uppermost label ID) obtained in the uppermost step of the downstream step group are the same (in the above example, the label ID-B and the label ID-C). Hence, the same label IDs are compared with each other and the histories of both of them are theory combined in thereby to obtain the history throughout the steps.

Also, the label IDs stored in a duplicated manner at the border between the upstream step group and the downstream step group are compared with each other, so that the history can be traced up to the upstream side from the downstream step group and conversely can be traced from the upstream step group down to the downstream side.

In this modified example, the two step groups of the upstream step group and the downstream step group are linked but the present invention is not limited thereto. The present invention is applicable to step groups of upstream steps, midstream steps, and downstream steps or much more step groups.

Thus, even in the case where plural systems are provided for traceability, those systems are linked to be usable as a single system.

Figure 29:
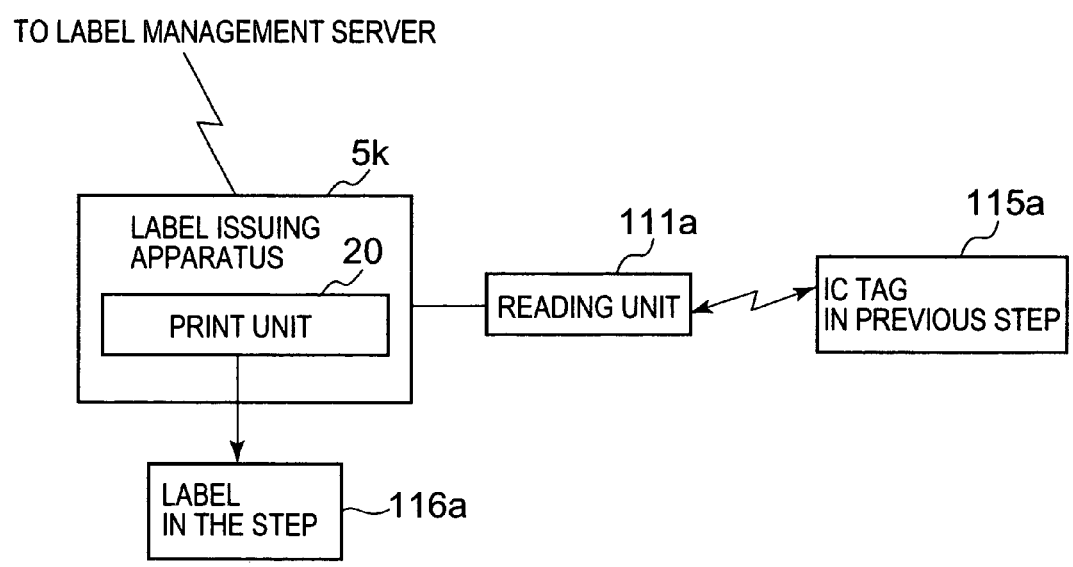
FIG. 29 schematically shows a functional structure of a label issuing apparatus having a function of reading an IC tag.

FIG. 29 schematically shows a functional structure of the label issuing apparatus 5k.

The label issuing apparatus 5k is structured, for reading the label ID from the IC tag attached in the previous step to print the label for the present step, to adapt to both the recording medium (IC tag) in the previous step and the recording medium (e.g., paper or plastics) in the present step.

Therefore, the label issuing apparatus 5k has a reader unit 111a including a reader/writer etc. and a print unit 20.

The reader unit 111a has the same structure as that of the reader unit 111 as described in Modified Example 7. The reader unit 111a reads the label ID stored in the IC tag 115 in the previous step by radio in a non-contact manner. The label issuing apparatus 5k acquires the label ID read by the reader unit 111a and transmits the acquired ID to the label management server 2b via the Internet 3.

The print unit 20 prints the label ID in the present step on a label 116a in the present step.

In the case of adopting the continuous steps across systems different in recording medium (for example, the IC tag and the label) used as mentioned above, the steps downstream of the border are given the reading function adaptable to the recording medium in the upstream steps and the output function adaptable to the recording medium in the downstream steps.

In this way, the label issuing apparatus 5k has reading means (reader unit 111) for reading the identification information (label ID) from the recording medium (IC tag) attached to the product in the adjacent step and the read label ID is transmitted to the product history management apparatus (label management server 2b).

Figure 30:
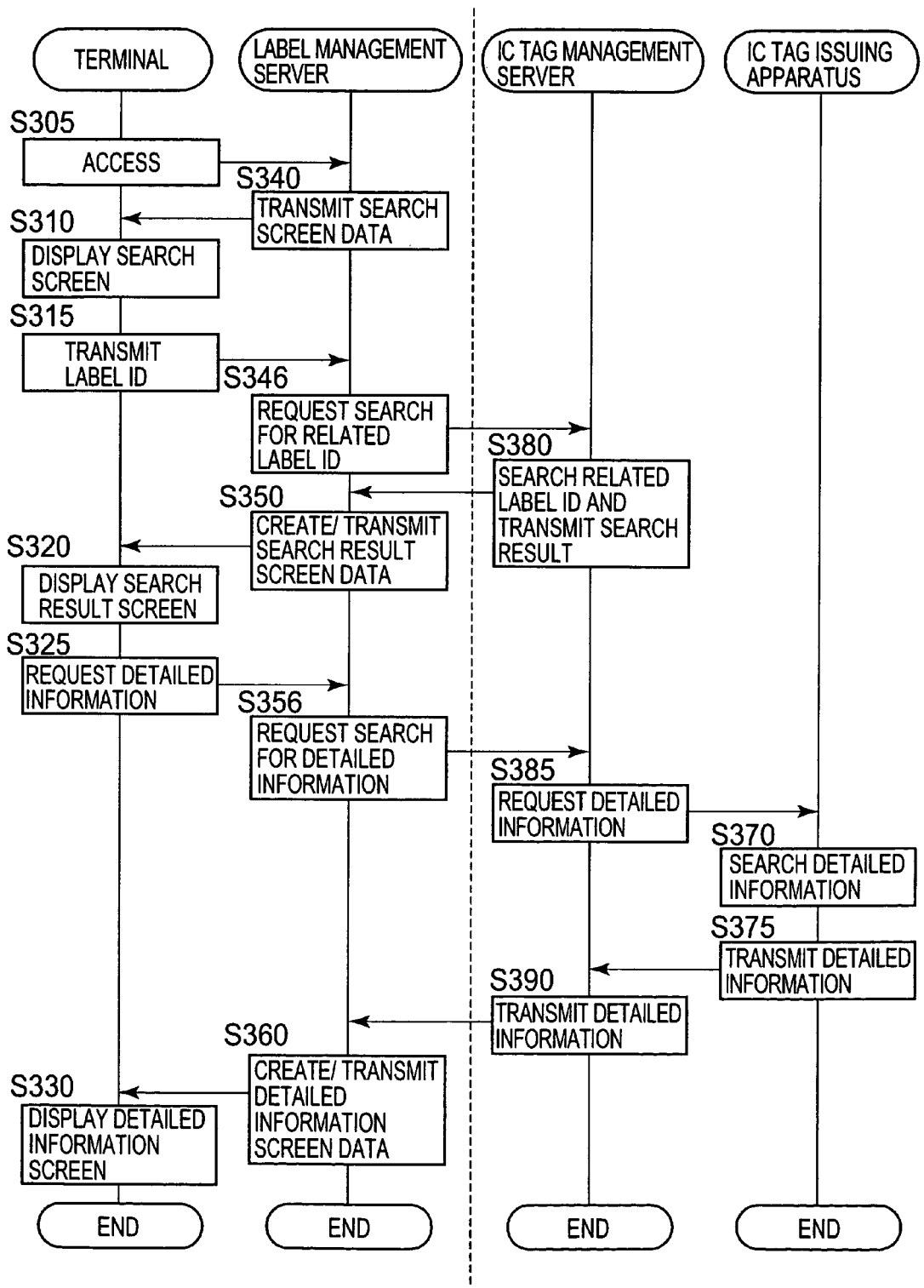
FIG. 30 is a flowchart illustrative of a procedure of providing a consumer with history search services with an IC tag management server in cooperation with a label management server.

Referring next to FIG. 30, a procedure of providing consumers with history search services will be described.

In this modified example, as described later, the history search service is provided by the IC tag management server 2a in cooperation with the label management server 2b.

Note that the steps corresponding to those of FIG. 22 are assigned the same step numbers.

First, the user (consumer and processor) operating each terminal 4 accesses the label management server 2a (step S305).

The label management server 2a transmits, in response to this access, the search screen data to the terminal 4 (step S340).

The terminal 4 receives the search screen data from the label management server 2b and displays the search screen on the display device (step S310).

The user inputs the label ID printed on the label affixed to the product on the search screen and transmits the ID to the label management server 2b (step S315).

The label management server 2b receives the label ID and searches the label ID management database 55b for the label ID and label IDs related to the target label ID in history. This is achieved by identification information search means of the label management server 2b.

Further, the label management server 2b communicates with the IC tag management server 2a and requests the IC tag management server 2a to search the label IDs related to the target label ID in history (step S346).

The label management server 2b transmits, in response to the search request, an uppermost label ID in the uppermost step out of label IDs searched through the label ID management database 55b to the IC tag management server 2a.

This is achieved by identification information search request means of the label management server 2b.

The IC tag management server 2a accepts the search request from the label management server 2b and searches the label ID management database 55a for the uppermost label ID received from the label management server 2b and the label IDs related to the label ID concerned in history. This is achieved by identification information search means of the IC tag management server 2a.

Then, the search result (searched label IDs and history relation therebetween) is sent to the label management server 2b (step S380).

This is achieved by searched identification information transmitting means of the IC tag management server 2a. In this case, the label management server 2b corresponds to an inquirer of the identification information.

The label management server 2b receives the search result from the IC tag management server 2a. This is achieved by requested identification information receiving means of the label management server 2b.

Then, the label management server 2b associates the received search result with the label IDs searched through the label ID management database 55*b* and creates data on history relation between the label IDs. The server also creates and transmits the search result screen data based on the history relation to the terminal 4 (step S350).

This is achieved by searched identification information transmitting means of the label management server 2*b*. The label ID searched through the identification information storage means (label ID management database 55*b*) and the identification information received from the IC tag management server 2*a* (other product history management device) are transmitted together with the associations to the terminal 4. Also, in this case, the terminal 4 corresponds to an inquirer.

That is, the following relation is established: the terminal 4 serves as the inquirer on the label management server 2*b* side, while the label management server 2*b* serves as the inquirer on the IC tag management server 2*a*.

The terminal 4 receives the search result screen data from the label management server 2*b* and displays the search result screen on the display device (step S320).

When the user makes a request to browse the detailed information (step S325), the label management server 2*b* collects the detailed information from the corresponding IC tag issuing apparatus or label issuing apparatus as follows.

Although not shown, a label ID is transmitted (second identification information transmitting means) to each label issuing apparatus (functioning as a detailed information storage device) which has printed a label ID (searched ID) and the label issuing apparatus is requested to transmit the detailed information associated with the label ID concerned.

Each label issuing apparatus 5 accepts the request (identification information inquiry accepting means), searches the detailed information database for the detailed information associated with the label ID received from the label management server 2*b* (detailed information search means), and transmits the searched information to the label management server 2*b* (inquirer) (detailed information transmitting means).

Thus, the label management server 2*b* receives the detailed information (detailed information receiving means).

Regarding detailed information related to the identification information stored in the IC tag issuing apparatus, the label management server requests the IC tag management server 2*a* to search the detailed information (step S356). This is achieved by detailed information search request means of the label management server 2*b*.

The IC tag management server 2*a* accepts the search request for the detailed information, and then transmits the label ID to each IC tag issuing apparatus that has written the label ID (searched ID) to the IC tag and requests the apparatus to transmit the detailed information associated with the label ID concerned (step S385). This is achieved by second identification information transmitting means of the IC tag management server 2*a*.

Each IC tag issuing apparatus accepts the request (identification information inquiry accepting means), searches the detailed information database for the detailed information associated with the label ID received from the IC tag management server 2*a* (detailed information search means) (step S370), and transmits the searched information to the IC tag management server 2*a* (detailed information transmitting means) (step S375).

Then, the IC tag management server 2*a* receives the detailed information (detailed information receiving means).

Furthermore, the IC tag management server 2*a* transmits the detailed information received from each IC tag issuing apparatus in association with the IC tag to the label issuing server 2*b* (step S390).

This is achieved by detailed information transmitting means of the IC tag management server 2*a*. In this case, the label management server 2*b* serves as an inquirer.

The label management server 2*b* receives the detailed information from the IC tag management server 2*a* (requested detailed information receiving means), creates the detailed information screen data using the detailed information received from each label issuing apparatus and the detailed information received from the IC tag management server 2*a*, and transmits the data to the terminal 4 (step S360). This is achieved by detailed information transmitting means of the label management server 2*b*.

Note that if the user requests outlined information, the "outlined" detailed information screen data is created. In contrast, if the user requests detailed information, the "detailed" detailed information screen data is created.

The terminal 4 receives the detailed information screen data from the label management server 2*b* and displays the detailed information screen using the data (step S330).

The detailed information screen displays the processing history of the product that the consumer purchases, for example, in chronological order. The user can grasp the product history from this screen display.

As mentioned above, in this modified example, the system using the IC tag and the system using the label can be linked to provide the history management service.

In the label management system 1*a*, the operator administering the system using the IC tag and the operator administering the system using the label may be the same or different.

Also, this modified example allows various modifications other than those mentioned above.

For example, it is possible to set up a Web site where the detailed information is posted in the IC tag management server 2*a*. In this case, for example, inquiries about the label IDs recorded on the IC tag are accepted on the Web site, and the label IDs and detailed information may be searched through the label management server 2*b*.

Also, in this modified example, the terminal 4 collects the detailed information through the IC tag management server 2*a* and the label management server 2*b*. However, it is possible that the addresses of the IC tag issuing apparatus or label issuing apparatus are obtained from the IC tag management server 2*a* or the label management server 2*b*, the label ID is directly transmitted to the IC tag issuing apparatus or label issuing apparatus, and the detailed information related thereto is received. In this case, the terminal 4 constitutes an inquirer of the detailed information.

Also, in this modified example, the terminal 4 inquires about the label ID or detailed information, but the IC tag issuing apparatus or label issuing apparatus may make a request to search the detailed information.

Also, a detailed information server may be provided, which collectively stores the detailed information instead of storing the detailed information in the IC tag issuing apparatus or label issuing apparatus.

Further, in this embodiment, the integrated circuit and the print medium are used as the recording medium, but other recording media such as a magnetic storage medium (e.g., magnetic tape) and magneto-optic storage medium (magneto-optic disc) can be used.

This modified example as set forth above produces the following effects.

(1) Even when the production steps extend over the plural industries and operators and the operators use the different recording media to manage the history, those media are linked, whereby the systems can function as a single history management system.

(2) The identification information issuing apparatus in the downstream step group has the function of reading an identifier recorded on a recording medium in the upstream step group, whereby the identification information issued in the upstream step group can be linked with the identification information in the downstream step group.

(3) The history in the upstream step group is combined with the history in the downstream step group in theory, whereby the history from the first step (starting point) to the last step can be grasped.

(4) The detailed information is stored while being distributed to the identification information issuing apparatuses, whereby the load on the server that stores the history relation of identifiers can be reduced.

(5) In the case where plural standards (e.g., there are 100 or more kinds of IC tags) are adopted in the same kind of recording media as well as in the case where different kinds of recording media are used (semiconductor circuit, print medium, etc.), the present invention can deal with such situations by providing the identification information issuing apparatus with the reading device that conforms to those standards.

(6) The adequate ID information can be issued independent of the connection between the industries, organizations, and steps, whereby the appropriate information system can be architected, which can deal with multiple items and cost low with efficiency.

(7) With automatic recognition and processing, the counterfeit or human error hardly occurs, whereby the more correct information linkage is allowed.

As mentioned above, this embodiment and each modified example aim to issue the label ID to the beef product as an example. However, an application range of the present invention is not limited thereto. The present invention is applicable to the production/distribution of meat products in general, fishery products, and farm products, the production/distribution of pharmaceuticals, and other industrial products.

What is claimed is:

1. In combination: a product history management apparatus for managing a product history by attaching a recording medium recording identification information to a product produced in each of production steps from raw material production to final product production, the product history management apparatus comprising:
   identification information receiving means for receiving, from identification information issuing apparatuses provided at least for each of partially continuous steps, identification information recorded on a recording medium attached in a step immediately preceding the step for which each of the identification information issuing apparatuses are provided;
   first identification information transmitting means for issuing new identification information with respect to the received identification information and transmitting the issued identification information to the identification information issuing apparatus; and
   identification information storage means for storing the received identification information in the immediately preceding step in association with the transmitted identification information; and
   a product history management system comprising:
   an upstream step group for electronically recording identification information to a semiconductor circuit and attaching the semiconductor circuit to a product; and
   a downstream step group for recording identification information on a label and affixing the label on a product;
   wherein the identification information receiving means of the product history management apparatus receives identification information issued in the upstream step group from the identification information issuing apparatuses; and
   wherein the identification information storage means of the product history management apparatus stores the received identification information in the upstream step group in association with the transmitted identification information to be printed.

2. A product history management apparatus used in a product history management system for managing a product history by attaching a recording medium recording identification information to a product produced in each of production steps from raw material production to final product production, the product history management apparatus comprising:
   identification information receiving means for receiving, from identification information issuing apparatuses provided at least for each of partially continuous steps, identification information recorded on a recording medium attached in a step immediately preceding the step for which each of the identification information issuing apparatuses are provided;
   first identification information transmitting means for issuing new identification information with respect to the received identification information and transmitting the issued identification information to the identification information issuing apparatus;
   identification information storage means for storing the received identification information in the immediately preceding step in association with the transmitted identification information;
   inquiry accepting means for accepting an inquiry about identification information from an inquirer of the identification information;
   identification information search means for searching the identification information storage means for the inquired identification information and identification information associated with the inquired identification information;
   searched identification information transmitting means for transmitting the searched identification information together with associations to the inquirer;
   second identification information transmitting means for transmitting identification information searched with the identification information search means to a detailed information storage device storing the identification information in association with detailed information related to a product attached with a recording medium recording the identification;
   detailed information receiving means for receiving detailed information associated with the transmitted identification information from the detailed information storage device;
   detailed information transmitting means for transmitting the received detailed information to the inquirer;
   identification information search request means for requesting another product history management apparatus storing identification information in a step next to each of the continuous steps to search identification information associated with the inquired identification information; and
   requested identification information receiving means for receiving the identification information searched in response to the request from the other product history management apparatus;

wherein the searched identification information transmitting means transmits to the inquirer the identification information searched through the identification information storage means and the identification information received from the other product history management apparatus.

3. A product history management apparatus according to claim 2; further comprising:

detailed information search request means for requesting the other product history management apparatus to search detailed information associated with the requested identification information; and requested detailed information receiving means for receiving the detailed information searched in response to the request;

wherein the detailed information transmitting means transmits the received detailed information to the inquirer.

* * * * *